(12) United States Patent
Nelson et al.

(10) Patent No.: US 9,222,627 B2
(45) Date of Patent: Dec. 29, 2015

(54) ANNULUS SHAPED LUMINAIRE

(71) Applicant: ABL IP Holding LLC, Conyers, GA (US)

(72) Inventors: Peter K. Nelson, Denver, CO (US); Carl T. Gould, Golden, CO (US); Kevin Franklin Leadford, Evergreen, CO (US); Christopher D. Slaughter, Denver, CO (US); Christopher J. Sorensen, Denver, CO (US)

(73) Assignee: ABL IP HOLDING LLC, Conyers, GA (US)

(*) Notice: Subject to any disclaimer, the term of this patent is extended or adjusted under 35 U.S.C. 154(b) by 0 days.

(21) Appl. No.: 14/257,585

(22) Filed: Apr. 21, 2014

(65) Prior Publication Data

US 2014/0313765 A1    Oct. 23, 2014

Related U.S. Application Data

(60) Provisional application No. 61/813,731, filed on Apr. 19, 2013.

(51) Int. Cl.
| F21K 99/00 | (2010.01) |
| F21V 8/00 | (2006.01) |
| F21S 8/08 | (2006.01) |
| F21V 5/08 | (2006.01) |
| F21Y 101/02 | (2006.01) |
| F21Y 103/02 | (2006.01) |

(52) U.S. Cl.
CPC . *F21K 9/52* (2013.01); *F21S 8/088* (2013.01); *G02B 6/0005* (2013.01); *G02B 6/0006* (2013.01); *G02B 6/0036* (2013.01); *G02B 6/0096* (2013.01); *F21V 5/08* (2013.01); *F21Y 2101/02* (2013.01); *F21Y 2103/022* (2013.01)

(58) Field of Classification Search
USPC ......... 362/216, 600, 601, 603, 604, 605, 616, 362/628, 511, 565, 581, 410, 431, 806
See application file for complete search history.

(56) References Cited

U.S. PATENT DOCUMENTS

| D191,128 | S | 8/1961 | Curtin et al. |
| D192,125 | S | 1/1962 | Lasker |
| D199,077 | S | 9/1964 | Turner |
| D199,078 | S | 9/1964 | Turner et al. |
| D199,999 | S | 1/1965 | Simon |
| D200,001 | S | 1/1965 | Simon |
| D200,214 | S | 2/1965 | Simon |
| 3,218,446 | A | 11/1965 | Langer |
| D341,221 | S | 11/1993 | Elazari |
| D407,842 | S | 4/1999 | Landefeld |

(Continued)

OTHER PUBLICATIONS

Hess America, Agena 720 LED Specification, web page retrieved from the internet http://www.hessamerica.com/Products/Lighting/Pole_Mounted_Luminaire/AGENA/, Aug. 19, 2014, 4 pages.
Hess America, Avalon 650 Specification, web page retrieved from the internet http://www.hessamerica.com/Products/Lighting/Pole_Mounted_Luminaire/AVALON/ , Aug. 19, 2014, 4 pages.

(Continued)

*Primary Examiner* — Laura Tso
(74) *Attorney, Agent, or Firm* — Kilpatrick Townsend & Stockton LLP

(57) ABSTRACT

An annulus shaped luminaire includes an annular structure that includes one or more luminous panels, and transition structure that couples a support structure of the luminaire with the annular structure. The one or more luminous panels emit light that illuminates an area adjacent to the luminaire.

23 Claims, 21 Drawing Sheets

(56) References Cited

U.S. PATENT DOCUMENTS

| | | | |
|---|---|---|---|
| 6,443,582 B1 * | 9/2002 | Tarne et al. | 362/23.16 |
| 7,160,010 B1 * | 1/2007 | Chinniah et al. | 362/511 |
| D571,494 S | 6/2008 | Friedman et al. | |
| D571,496 S | 6/2008 | Lenz | |
| D574,103 S | 7/2008 | Minami et al. | |
| D578,694 S | 10/2008 | Zeng et al. | |
| D583,494 S | 12/2008 | Friedman et al. | |
| D591,884 S | 5/2009 | Tortel | |
| D597,696 S | 8/2009 | Sabernig | |
| D599,496 S | 9/2009 | Lodhie | |
| D599,935 S | 9/2009 | van Klinken | |
| D601,291 S | 9/2009 | Nankil | |
| D614,789 S | 4/2010 | van Klinken | |
| D615,682 S | 5/2010 | van Klinken | |
| D616,130 S | 5/2010 | Tortel | |
| D623,337 S | 9/2010 | Zheng | |
| D624,228 S | 9/2010 | Nankil | |
| D627,910 S | 11/2010 | Fazzari | |
| D652,976 S | 1/2012 | Soto et al. | |
| D672,074 S | 12/2012 | Compton | |
| D679,042 S | 3/2013 | Yu | |
| D725,304 S | 3/2015 | Nelson et al. | |
| D725,305 S | 3/2015 | Nelson et al. | |
| 2009/0129121 A1 * | 5/2009 | Yoneda | 362/628 |
| 2009/0316436 A1 * | 12/2009 | Takahashi et al. | 362/628 |
| 2010/0014290 A1 | 1/2010 | Wilcox | |
| 2013/0003409 A1 * | 1/2013 | Vissenberg et al. | 362/606 |
| 2013/0201683 A1 * | 8/2013 | Kirchberger et al. | 362/235 |

OTHER PUBLICATIONS

Louis Poulsen Ughting; Albertslund Maxi Post Product Spectfication, web page retrieved www.louispoulsen.com on Aug. 19, 2014, 3 pages.

Selux, Astro 2—flat glass SX 1182 11-9, web page retrieved from www.selux.com on Aug. 19, 2014 bearing copyright date of Apr. 2014, 2 pages.

Selux, Saturn 5 SX 470 72-9, web page retrieved from www.selux.com on Aug. 19, 2014 bearing copyright date of Sep. 2013, 2 pages.

Selux, Exterior catalogue, (selected pages) retrieved from www.selux.com on Aug. 27, 2014 bearing copyright date of 2014, pt. 1, 28 pages.

Selux, Exterior catalogue, (selected pages) retrieved from www.selux.com on Aug. 27, 2014 bearing copyright date of 2014, pt. 2, 27 pages.

Selux, Exterior catalogue, (selected pages) retrieved from www.selux.com on Aug. 27, 2014 bearing copyright date of 2014, pt. 3, 32 pages.

Selux, Exterior catalogue, (selected pages) retrieved from www.selux.com on Aug. 27, 2014 bearing copyright date of 2014, pt. 4, 23 pages.

Lithonia Lighting, Ratio Post Top 1.52 TLPRO152 LED Area Luminaire, web page retrieved from www.lithnia.com on Aug. 19, 2014 bearing copyright date of 2013, 3 pages.

Notice of Allowance for U.S. Appl. No. 29/488,564, mailed Nov. 10, 2014.

Notice of Allowance for U.S. Appl. No. 29/488,562, mailed Nov. 14, 2014.

* cited by examiner

ANNULUS SHAPED LUMINAIRE

CROSS-REFERENCES TO RELATED APPLICATIONS

This application claims priority to Provisional U.S. Patent Application No. 61/813,731, filed Apr. 19, 2013, entitled "Annulus Shaped Outdoor Luminaire," the entire disclosure of which is hereby incorporated by reference, for all purposes, as if fully set forth herein.

BACKGROUND

Existing outdoor light-emitting diode ("LED") area luminaries are often equipped with individual LED over-optics. The use of individual optics allows for precise control of the distribution and can increase efficiency. However, such optics can also cause the luminaire to appear pixelated in both the on and off state. Further, when energized these pixelated luminaries sometimes provide a substantially direct view of one or more LEDs, which are often very bright, resulting in glare and/or discomfort to the viewer.

SUMMARY

In an embodiment, an annulus shaped luminaire includes an annular structure that includes one or more luminous panels, and transition structure that couples a support structure of the luminaire with the annular structure. The one or more luminous panels emit light that illuminates an area adjacent to the luminaire.

BRIEF DESCRIPTION OF THE DRAWINGS

The present disclosure is described in conjunction with the appended figures.

DETAILED DESCRIPTION

Certain embodiments herein include a luminaire with a circular or an annulus form factor, called herein an annulus shaped luminaire. Such luminaries may be of roughly pedestrian or parking-lot scale, may be utilized in indoor or outdoor applications, and may emit light originating from light-emitting diodes ("LEDs"). Certain embodiments feature a solid or hollow light guide that may be utilized in the annulus shaped luminaries or in other luminaries. Light emitting sources are referred to herein as LEDs, but it is understood that incandescent, fluorescent, organic LED and other light emitter types may be substituted for LEDs without limitation. Also, although LEDs are often perceived as "point" light sources, it is also understood that where suitable for an application, line shaped, tube shaped or area shaped light emitters may be utilized in place of point sources.

Annulus Shaped Luminaire

In certain embodiments, an annulus shaped luminaire is illuminated using one or more back-lit or edge-lit panels so that the LEDs are obscured from direct view, with the light emitted by the LEDs distributed over a net area of one or more luminous panel(s) to reduce glare and increase visual comfort. Presently available LEDs can emit large amounts of light from very small areas, which can lead to significant viewer discomfort and perceived disincentive to utilize LEDs as light sources. However, the luminous panels described herein can spread the light from LEDs across large areas so as to minimize such viewer discomfort. The panels can be engineered to create a plurality of different yet precise light distributions that depend on the specific application. In certain embodiments, the panels may be back-lit, edge-lit, or both.

Figure 1:
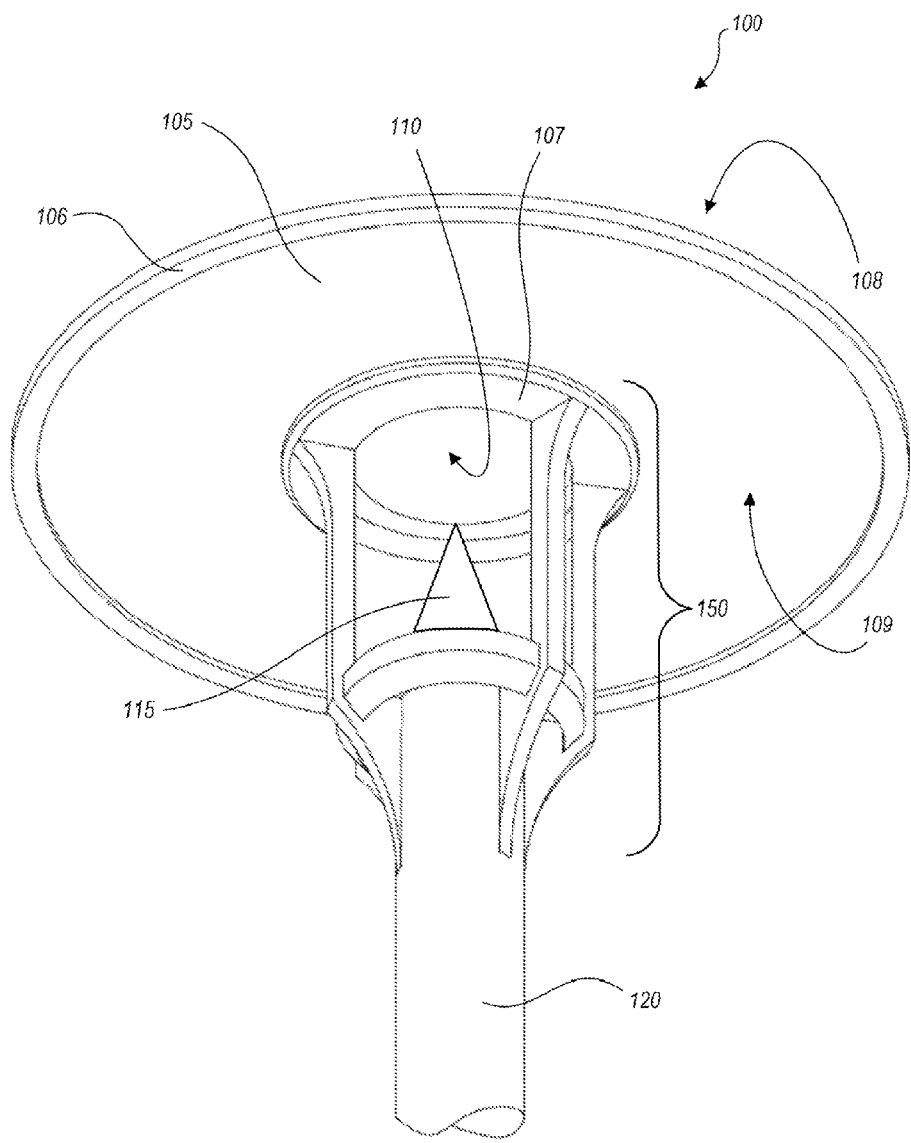
FIG. 1 shows an annulus shaped luminaire, according to an embodiment.

FIG. 1 shows annulus shaped luminaire 100, according to an embodiment. Annulus shaped luminaire 100 includes an annulus light source 105 that forms an opening 110, and an optional accent light 115. Annulus shaped luminaire 100 can be coupled with support structure, such as a pole 120. Accent light 115 may be considered part of a transition structure 150 that couples the support structure with an annular structure (e.g., annulus light source 105 and its surrounding structure) that is configured to emit light to illuminate an area adjacent to luminaire 100; other types of transition structure 150, with or without an accent light 115, are possible. In the example of luminaire 100, annulus light source 105 circumscribes the full 360° arc of the annular structure.

Annulus light source 105 emits light from one or more LEDs (not shown in FIGS. 1-6, see FIGS. 5-21) in a back-lit or an edge-lit configuration. In the back-lit configuration, annulus light source 105 is formed, for example, of a translucent, refractive and/or diffuse optical material with the one or more LEDs emitting into a topside surface thereof. Annulus light source 105 thus directs or scatters light from the LEDs as it passes through the optical material. In this way, individual LEDs may not be seen by a viewer, who is typically viewing luminaire 100 from below. Instead, the light appears to the viewer as distributed substantially uniformly from annulus light source 105.

In an edge-lit configuration, LEDs may be positioned within an inner annulus ring 107 and/or an outer annulus ring 106, such that they direct light into annulus light source 105. In certain embodiments, annulus light source 105 can be partially or completely covered with an optional, reflective (e.g., diffusely or specularly reflective) back (or top) surface 108 and/or a diffuse bottom surface 109. Back surface 108 can be opaque to reduce undesirable upward light emission from luminaire 100, instead reflecting the light downward to desirably increase light emission from surface 109. The light from the LEDs can enter annulus light source 105 from the LEDs and exit annulus light source 105 through bottom surface 109. Edge-lit configurations may also include light tubes, as described below. Opening 110 advantageously encourages convective air flow therethrough when heat is generated at inner ring 107 and/or accent light 115, facilitating heat dissipation therefrom.

In either the back-lit or the edge-lit configuration, annulus light source 105 can include optics and/or optical elements that direct light into a specific photometric distribution. The exiting light may or may not be Lambertian; in particular, light emitting surfaces of annulus light source 105 may emit light preferentially in directions where the light is most useful. For example, more light may be emitted in a direction of a pathway or roadway, and less light may be emitted in directions transverse to the pathway or roadway that are less useful to a viewer. In certain embodiments, an annulus is broken into segments that include different light sources and/or directional optics from one another; see, e.g., FIGS. 2-5.

Annulus light source 105 can include other form factors such as a square with an open center, square with a closed center, round (disc) with a closed center, etc.

Accent light 115 can include any type of light source and may be decorative in nature and/or separately controllable from annulus light source 105. That is, in embodiments, the majority of light produced by luminaire 100 can come from annulus light source 105, with a smaller amount of light coming from accent light 115. In this way, the nature of the light (e.g. color, photometric distribution, luminance, etc.) emitted by accent light 115 can be made insignificant as compared to the ambient illumination provided by annulus light source 105 and/or the energy efficiency or net photometric distribution of luminaire 100. (However, in embodiments, when accent light 115 conveys information as discussed below, accent light 115 may momentarily emit a majority of light produced by luminaire 100; e.g., as one or more attention getting pulse(s) of light.) Accent light 115 can have any type of shape, such as a flame shape, a cone, cylinder, rod, simulation of a lantern, etc. As another example, accent light 115 can be clear or frosted. As another example, accent light 115 can include a clear or frosted cylinder surrounding a light emitting device within accent light 115. As yet another example, accent light 115 can produce a visual effect such as flicker and/or other dynamic changes of color, luminance, pattern, etc. Also, accent light 115 may include one or more light emitting devices that may be combined as appropriate to provide a desired accent light and/or information conveying capability. For example, accent light 115 may include LEDs of various colors that combine as appropriate to form a desired output color, may include a high intensity strobe type light emitter that is only utilized for warning situations, and the like.

In certain embodiments, the characteristics of accent light 115 can be used for signaling purposes to convey information, for example to direct individuals to specific locations and/or to represent locations or events. For example, the color, luminance, and/or dynamics of accent light 115 of one luminaire 100 can be unique among a plurality of luminaries 100 to indicate, for example, a location (e.g. airport or mall parking sections), a special function (e.g., emergency call box), a warning or condition (e.g., tornado, flood, tsunami and/or avalanche warnings, parking available or full), a pathway designation, etc. In certain embodiments, these signaling functions can be controlled separately from main light source (annulus light source 105). Brightness of accent light 115 may be customized to an urgency of information to be delivered; e.g., warnings of hazardous conditions may include very bright or pulsating light from accent light 115, but routine pathway designations or parking available indicators may include less bright or steady color changes. In embodiments that convey information, annulus light source 105 and/or accent light 115 may be controlled by control electronics, including without limitation discrete logic, processors, microcontrollers or microcomputers, and the information to be conveyed may be received by luminaire 100 through wired or wireless connections. In yet other embodiments, accent light 115 can be used to create a perceived overall color or color temperature (warm vs. cool) of luminaire 100.

Figure 2:
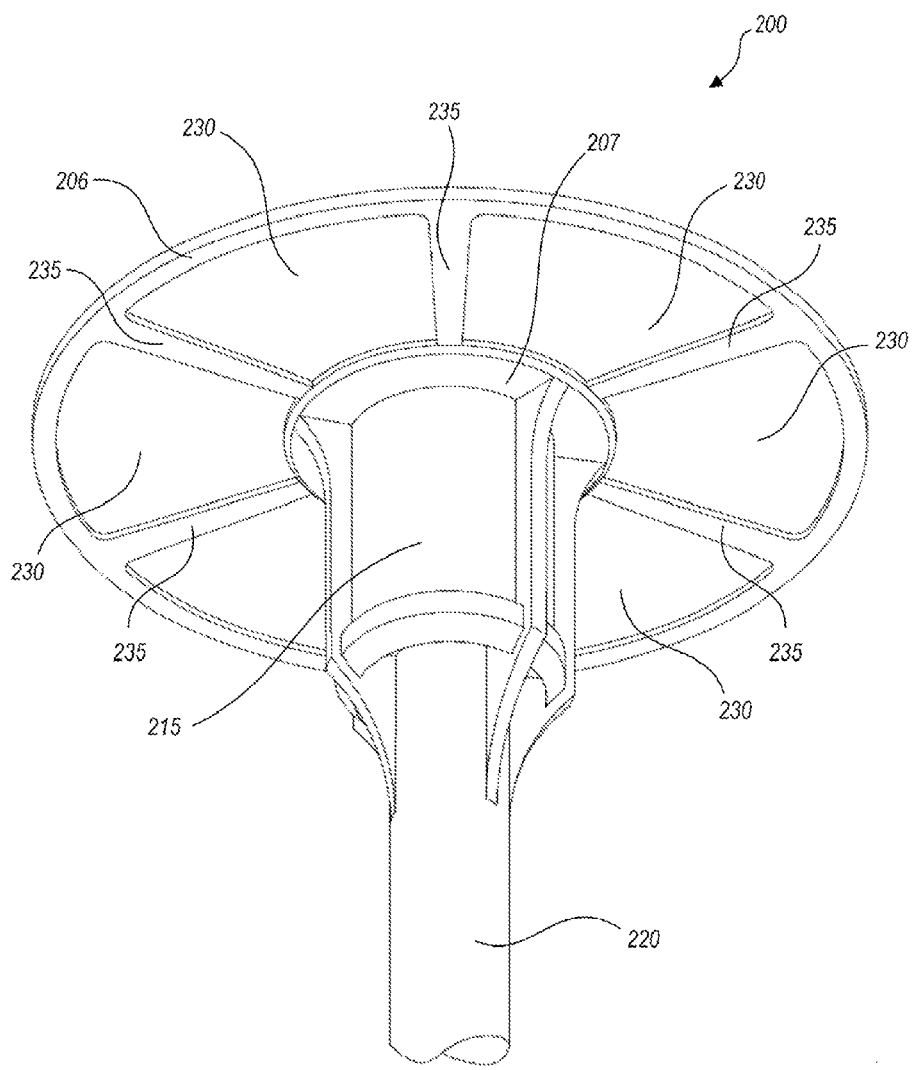
FIG. 2 shows an annulus shaped luminaire having six luminous panels divided by six mullions, according to an embodiment.

FIG. 2 shows an annulus shaped luminaire 200 having six luminous panels 230 divided by six radial mullions 235, according to an embodiment (one mullion 235 is hidden in the view of FIG. 2). Although six panels 230 are shown in FIG. 2, any number of panels 230 and/or mullions 235 may be used. In this example, each luminous panel 230 circumscribes a 60° arc of the annulus. Also shown in FIG. 2 are an accent light 215, an outer ring 206 and inner ring 207 of the annulus, and a supporting pole 220 for the luminaire.

As compared with luminaire 100, of luminaire 200 (and luminous panels 330, 331, FIG. 3) mullions 235 essentially break up annulus light source 105 into luminous panels 230 of a certain size or angular dimension. In certain embodiments, this may assist in assembly or manufacturing; for example, individual sectors or panels could be engineered to provide only a portion of an overall required area distribution. When combined, luminous panels 230 create an overall desired photometric distribution, while each panel 230 may also be configured to provide a distinct level of lumen output, color and/or color temperature of light. Likewise, individual panels 230 could be configured to be independently controllable (e.g. dimmed or switched). In other embodiments, certain panels do not include light sources, but are simply decorative elements in an annulus shaped luminaire.

Figure 3:
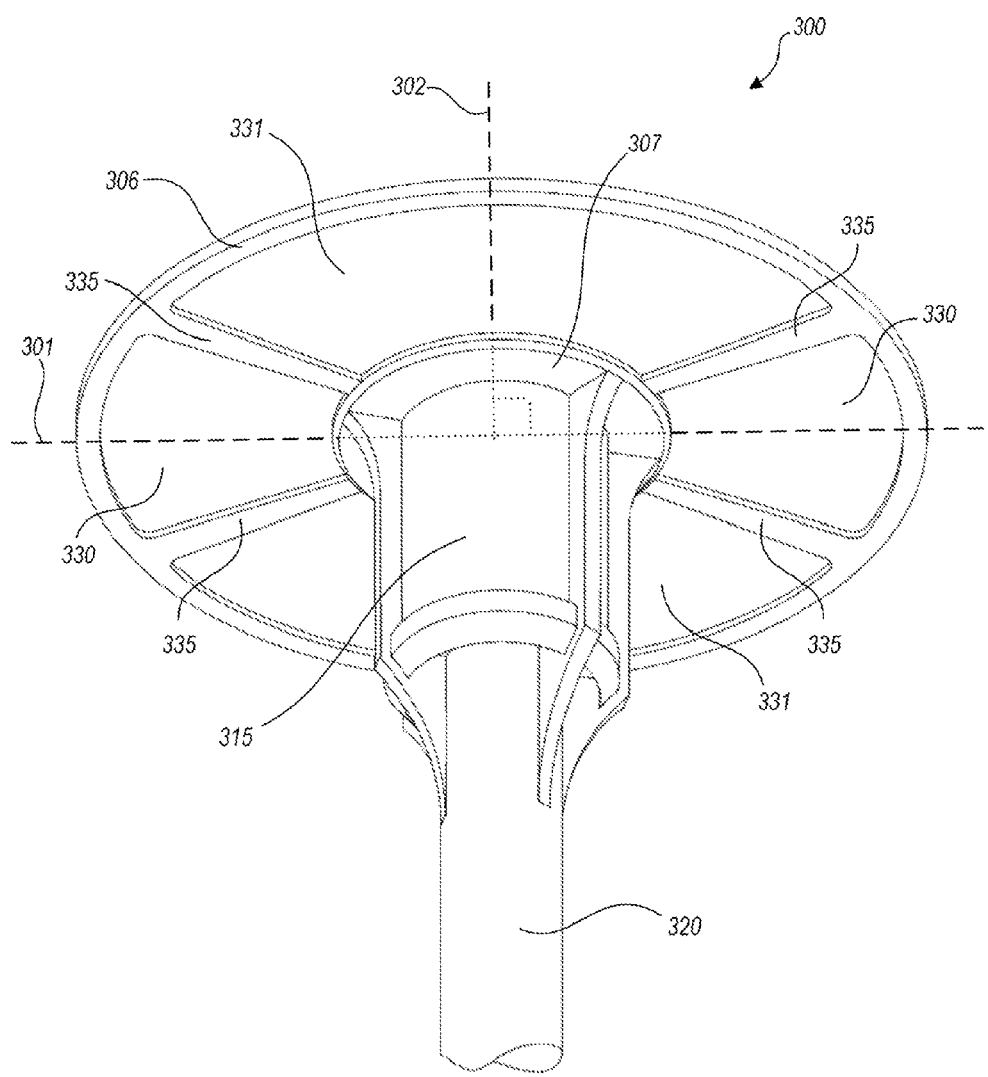
FIG. 3 shows an annulus shaped luminaire having four luminous panels divided by four mullions, according to an embodiment.

FIG. 3 shows an annulus shaped luminaire 300 having four luminous panels 330, 331 divided by four mullions 335, according to an embodiment. In this embodiment, the smaller luminous panels 330 can be engineered to provide a distribution suitable for a pedestrian sidewalk. In luminaire 300, each luminous panel 330 circumscribes a 60° arc of the annulus, and each luminous panel 331 circumscribes a 120° arc of the annulus. Each pair of luminous panels 330 is disposed in a diametrically opposed fashion across the annulus with respect to the other, and each pair of luminous panels 331 is similarly disposed in a diametrically opposed fashion across the annulus with respect to the other, interspersed with panels 330 about the annulus, as shown. One of the larger luminous panels 331 may provide, for example, a suitable distribution of light for illuminating a roadway or pathway, while others of the luminous panels 330, 331 can be configured to limit light that is "spilled" towards homes or businesses. In this manner, luminous panels 330, 331 may be configured to create specific custom distributions and lumen outputs limited only by the number of sectors (which could be variable). That is, in embodiments, luminous panels 330, 331 may be arranged as pairs that include differing types of directional optics and/or light sources such that light is emitted from luminaire 300 in differing directions and/or luminous intensities from one another. FIG. 3 shows a first axis 301 about which luminous panels 330 are symmetrically disposed, and a second axis 302 about which luminous panels 331 are symmetrically disposed. Each axis 301 and 302 is shown as a broken line on an underside of panels 330 and 331, continuing as a dotted line inside accent light 315; axis 302 continues behind accent light 315 in the view of FIG. 3. Axis 302 is perpendicular to axis 301, as shown. Directional optic types and/or light sources of luminous panels 330 and/or 331 may be arranged such that light emitted from panels 330 is symmetric about axis 301 and light emitted from panels 331 is symmetric about axis 302, with the light distributions about axes 301 and 302 being the same in some embodiments, and different from one another in other embodiments. It is understood that luminous panels 230, FIG. 2, luminous panels 430 and 431, FIG. 4, and other arrangements of luminous panels about an annulus, could form similar symmetric arrangements.

Also shown in FIG. 3 are an accent light 315, an outer ring 306 and inner ring 307 of the annulus, and a supporting pole 320 for the luminaire. In embodiments, nonluminous panels may replace luminous panels 330, 331, that is, the nonluminous panels would not emit light, and would be merely decorative elements within the annulus where they are located.

Figure 4:
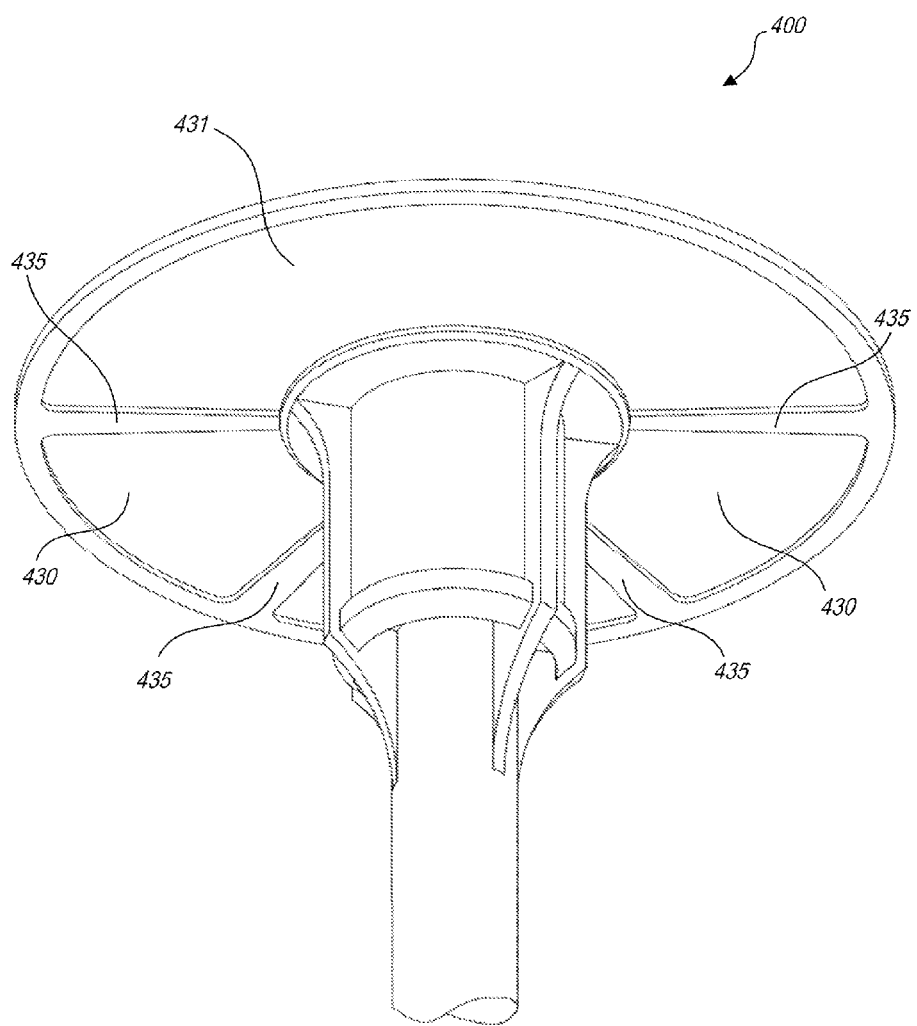
FIG. 4 shows an annulus shaped luminaire having four luminous panels divided by four mullions, according to an embodiment.

FIG. 4 shows an annulus shaped luminaire 400 having four luminous panels 430, 431 divided by four mullions 435 according to an embodiment. In this embodiment, a large luminous panel 431 forms half the annulus shape, while smaller luminous panels 430 form the rest of the annulus.

Figure 5:
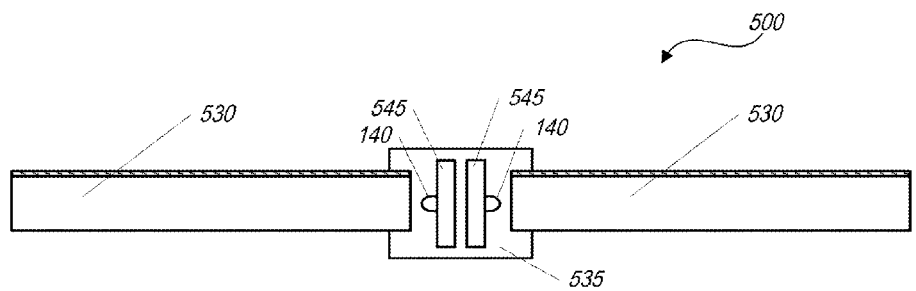
FIG. 5 is a schematic cross-sectional diagram of a portion of an annulus shaped luminaire, in which LEDs emit light directly into luminous panels, according to an embodiment.

FIG. 5 is a schematic cross-sectional diagram of a portion of an annulus shaped luminaire 500 in which LEDs emit light directly into luminous panels 530. Luminaire 500 includes LED circuit boards 545 with LEDs 140 thereon. LED circuit boards 545 are placed perpendicular to luminous panels 530, with a housing 535 that extends around one or more edges of panels 530. This allows LEDs 140 to emit light laterally, directly into panels 530. Housing 535 may for example be, or form at least part of, one of mullions 235, 335 or 435, FIGS. 2, 3, 4 respectively. Arrangements similar to that shown in FIG. 5 are not limited to the two-sided use shown, or use in connections with mullions; for example, LEDs may be mounted within an inner or outer ring of an annulus shaped luminaire, and may emit light laterally, directly into a light guide.

Figure 6:
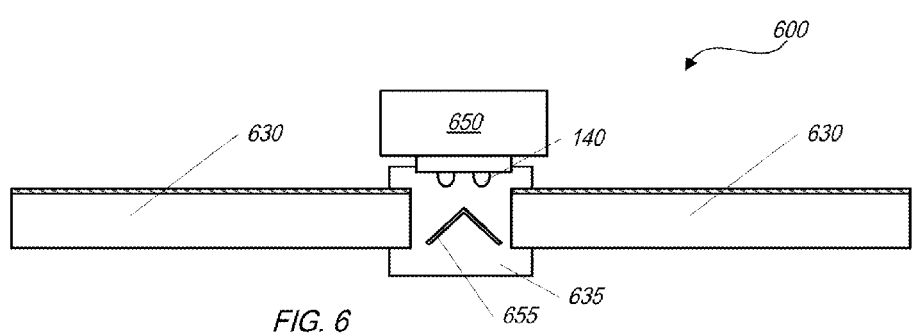
FIG. 6 is a schematic cross-sectional diagram of a portion of an annulus shaped luminaire that utilizes reflectors to redirect light emitted by LEDs into luminous panels, according to an embodiment.

FIG. 6 is a schematic cross-sectional diagram of an annulus shaped luminaire 600 that utilizes reflectors to redirect light emitted by LEDs into luminous panels. As shown in FIG. 6, according to certain embodiments, LEDS 140 can be positioned within a mullion 635 such that LEDs 140 do not emit light directly into luminous panels 630. Instead, LEDs 140 can be positioned parallel to the plane of panels 630, with light emitting from LEDs 140 being redirected by a reflector 655 that directs the light into panels 630. In an embodiment, luminaire 600 also includes an optional heat sink 650 that thermally couples with LEDs 140 to remove heat generated thereby. Arrangements similar to that shown in FIG. 6 are not limited to the two-sided use shown, or use in connections with mullions; for example, LEDs may be mounted within an inner or outer ring of an annulus shaped luminaire, with a single reflector redirecting the light therefrom into a light guide.

Figure 7:
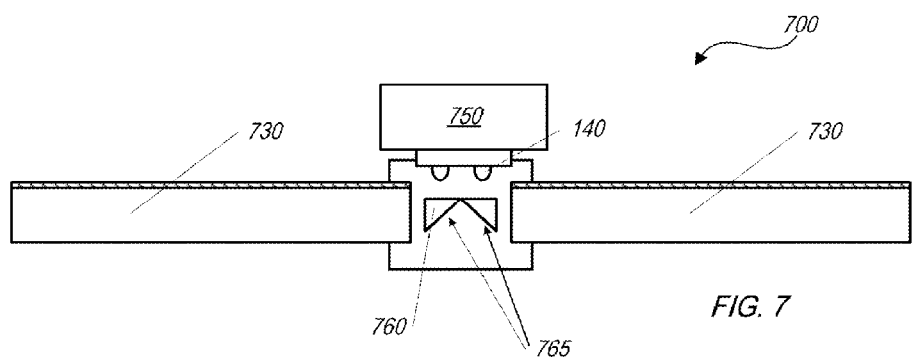
FIG. 7 is a schematic cross-sectional diagram of a portion of an annulus shaped luminaire that utilizes optics to redirect light emitted by LEDs into luminous panels, according to an embodiment.

FIG. 7 is a schematic cross-sectional diagram of a portion of an annulus shaped luminaire 700 that utilizes optics to redirect light emitted by LEDs 140 into luminous panels. In luminaire 700, a directional optic 760 (e.g., one or more prisms, optionally having reflective surfaces 765) is utilized to redirect light from LEDs 140 into luminous panels 730. Directional optics 760 are shown as right triangular prisms in FIG. 7, but it is understood that in embodiments, directional optics may be of different geometries, may include surfaces that reflect through total internal reflection or through explicitly reflective (e.g., metalized) surfaces, and the like. In an embodiment, luminaire 700 also includes an optional heat sink 750 that thermally couples with LEDs 140 to remove heat generated thereby. Arrangements similar to that shown in FIG. 7 are not limited to the two-sided use shown, or use in connections with mullions; for example, LEDs may be mounted within an inner or outer ring of an annulus shaped luminaire, with a single directional optic redirecting the light therefrom into a light guide.

In other embodiments, a reflector (e.g., reflector 655) or a directional optic (e.g., a prism having a reflective surface 765) may be used to direct light into only a single panel. By positioning LEDs in this manner, the LEDs advantageously utilize luminaire structure as a heat sink, allowing for greater wattage LEDs to be used, and/or to increase the efficiency and/or reliability of the LEDs through thermal management.

Hollow Light Guide

A light guide is a general concept of directing light through a medium, be it liquid, gas, or solid, or any combination thereof, using that medium as a channeling mechanism for the light. One example of a light guide is a fiber-optic. Generally, when a light guide is utilized, some sort of mechanism extracts and redirects all, or certain percentages of, the light out of the light guide into specific directions.

In certain embodiments herein, a light guide can channel light from a plurality of LEDs. The LEDs may be arranged in groups, for example in one or more curves or straight lines. These, however, are not the only options for arranging LEDs; for example, LEDs could be located in grids, rectangles or any other regular or stochastic arrangement. The LEDs may be disposed on one or multiple sides of the light guide. The LEDs thus arranged may emit light either directly into the light guide, or could emit light that is redirected by refractive and/or reflective optics into the light guide (as in luminaries 600, 700 discussed above).

Additionally, an advantage of using a hollow light guide (hollow referring to the light traveling through air, through at least part of the light guide) is that air has virtually no absorption of light that travels through it. Acrylic and other "clear" plastics and optical materials generally have small levels of absorption which can add up to significant net absorption along longer light guides. Therefore, since a luminaire (light fixture) is generally designed to provide a maximum quantity of light for a given power input (e.g., not simply getting light to its destination at a perceivable level, such as in communication fiber optics) a hollow light guide may be advantageous. Also, since the annulus shaped luminaries discussed above may benefit from having light spread out over a luminous panel surface, hollow light guides may be an attractive choice for implementing luminous panels of such luminaries.

A hollow guide can be thought of as forming two interacting surfaces, bracketing where the LEDs would reside. In the case of a light guide that essentially forms a horizontal plane, one of the interacting surfaces would be on the top and one on the bottom. Alternatively, if the LEDs were oriented vertically, the light guide might be a vertically oriented plane and the interacting surfaces would be on the sides of the plane. Each of these surfaces can act as "passive" or "active." In this disclosure, the term "passive" refers to a surface and or material that is image preserving; e.g., surfaces or combinations of surfaces that are substantially flat and act as transmissive and/or reflective surfaces, or a material that is essentially transparent. Conversely, the term "active" refers to surfaces, combinations of surfaces and/or materials having optical features that redirect light in a specific way other than simple transmission and/or reflection. For example, an "active" surface might include optical features such as prisms, an adjacent, diffuse layer (e.g., paint, or a volumetric layer dense with refractive index discontinuities, such as bubbles) or a diffuse or reflective etched surface that controls or redirects light. An "active" material might be translucent or include refractive index discontinuities. In certain embodiments, a light guide may have several layers of passive or active materials, either on a top or on a bottom surface thereof. Layers of active surfaces could be used to achieve desired effects or distributions on either side of a hollow light guide.

Figure 8A:
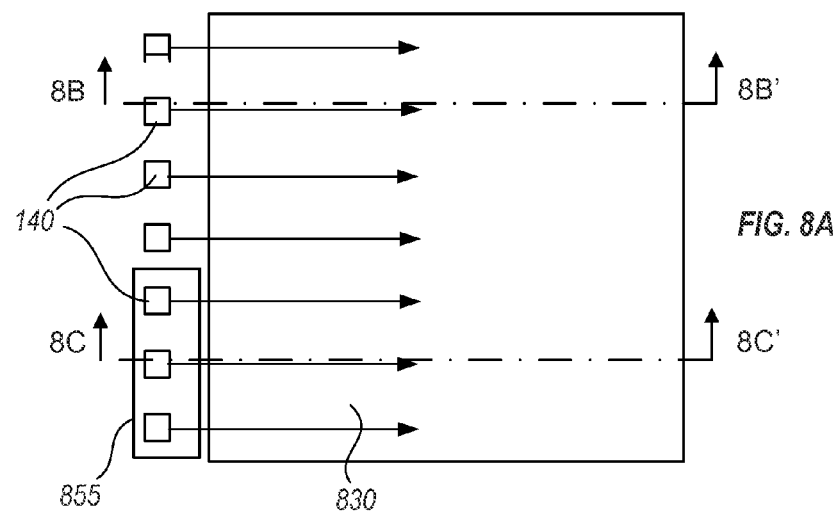
FIG. 8A schematically illustrates, in a plan view, LEDs emitting light into a hollow light guide, according to an embodiment.
Figure 8B:
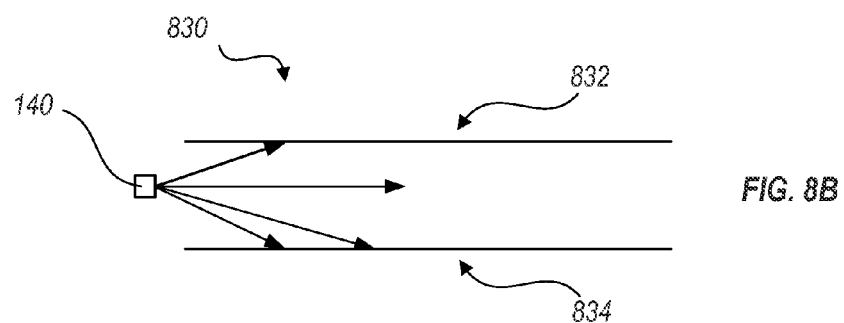
FIG. 8B is a schematic cross-sectional view taken at line 8B-8B' in FIG. 8A, and illustrates direct emission of light from one of the LEDs into the hollow light guide, according to an embodiment.
Figure 8C:
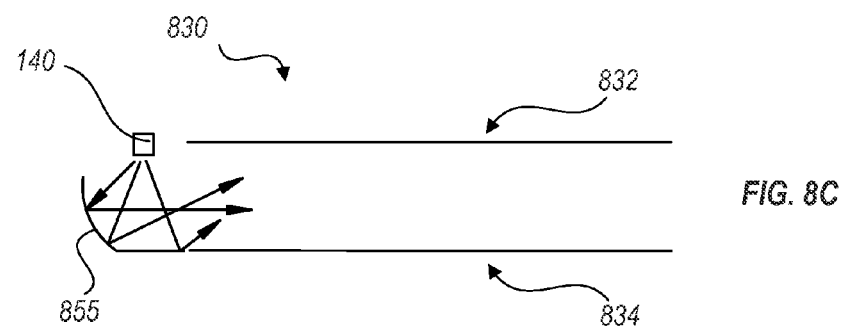
FIG. 8C is a schematic cross-sectional view taken at line 8C-8C' in FIG. 8A, and illustrates reflection of light from one of the LEDs by a reflector into the hollow light guide, according to an embodiment.

For example, FIG. 8A schematically illustrates, in a plan view, LEDs 140 emitting light into a hollow light guide 830. FIG. 8B is a schematic cross-sectional view taken at line 8B-8B' in FIG. 8A, and illustrates direct emission of light from one of the LEDs 140 into hollow light guide 830 (not every LED 140 is labeled in FIG. 8A, for clarity of illustration). FIG. 8C is a schematic cross-sectional view taken at line 8C-8C' in FIG. 8A, and illustrates reflection of light from one of the LEDs 140 by a reflector 855 into hollow light guide 830. Hollow light guide 830 is bounded by an upper surface 832 and a lower surface 834; although FIGS. 8B and 8C show upper surface 832 and lower surface 834 as simple planes (lines), it is understood that each may be a reflector (e.g., a highly reflective surface, such as a thin metallic layer) and/or one or more layers of material. Also, it is to be understood that terms such as "upper" and "lower" are utilized herein only for convenient reference to the directions that a reader will perceive as "up" and "down" in specific illustrations; such references do not mean that "upper" or "lower" features of light guides that are not oriented as shown in the drawings will behave differently.

Figure 9:
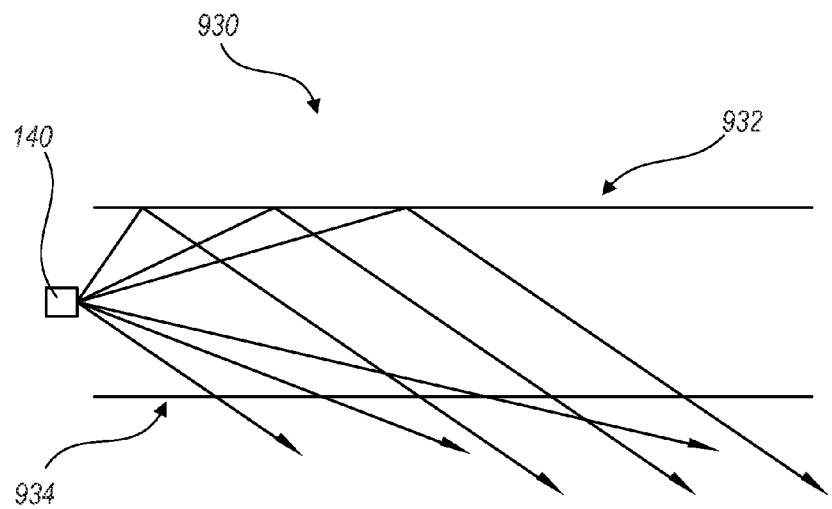
FIG. 9 is a schematic ray-trace, two-dimensional ("2D") diagram illustrating operation of a hollow light guide having a passive reflective top surface in combination with a passive transmissive bottom surface, according to an embodiment.

FIG. 9 is a schematic ray-trace, two-dimensional ("2D") diagram illustrating operation of a hollow light guide 930 having a passive reflective top surface 932 in combination with a passive transmissive bottom surface 934. The example of FIG. 9 shows light entering the light guide from a single side and being emitted from only one surface.

Figure 10:
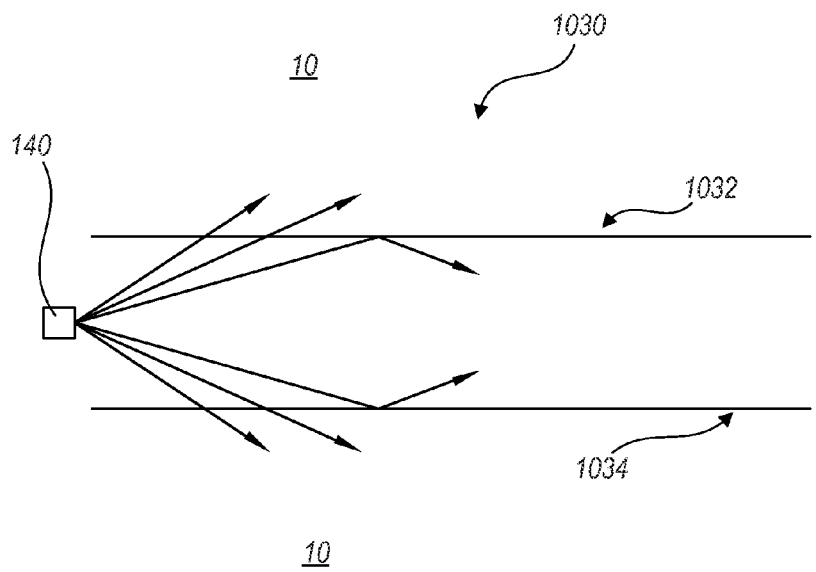
FIG. 10 is a schematic 2D ray-trace diagram illustrating operation of a combination of a hollow light guide having a passive transmissive upper surface and a passive transmissive lower surface, according to an embodiment.

FIG. 10 is a schematic 2D ray-trace diagram illustrating operation of a combination of a hollow light guide 1030 having a passive transmissive upper surface 1032 and a passive transmissive lower surface 1034. FIG. 10 therefore illustrates a double-emitting hollow light guide. Other variations would be possible. One advantage of double-emitting hollow light guide 1030 is that a passive transmissive surface (for example a clear acrylic flat panel or sheet) may pipe at least a fraction of incident light rays down the length of hollow light guide 1030 by reflecting a portion of the incident light via Fresnel reflections (see also FIG. 11). This would allow small to large portions of light injected from LED(s) 140 to exit the passive transmissive surface, depending on incident angle and refractive indices, while the upper and lower surfaces act as specular reflectors to the remaining light, continuing its piping and maintaining the light guide behavior. Notably, FIG. 10 shows that some external light emission is possible from a hollow light guide when both surfaces are passive. However, it is appreciated that a degree of such emission depends on factors such as an angle at which the light is injected into and/or reflected within hollow light guide 930, as well as refractive indices of bottom surface 934 and an adjacent medium 10. That is, when there is a refractive index difference between bottom surface 934 and adjacent medium 10 there will always be Fresnel reflection of some portion of the incident light, but at shallow angles, the Fresnel reflections will be stronger.

Figure 11:
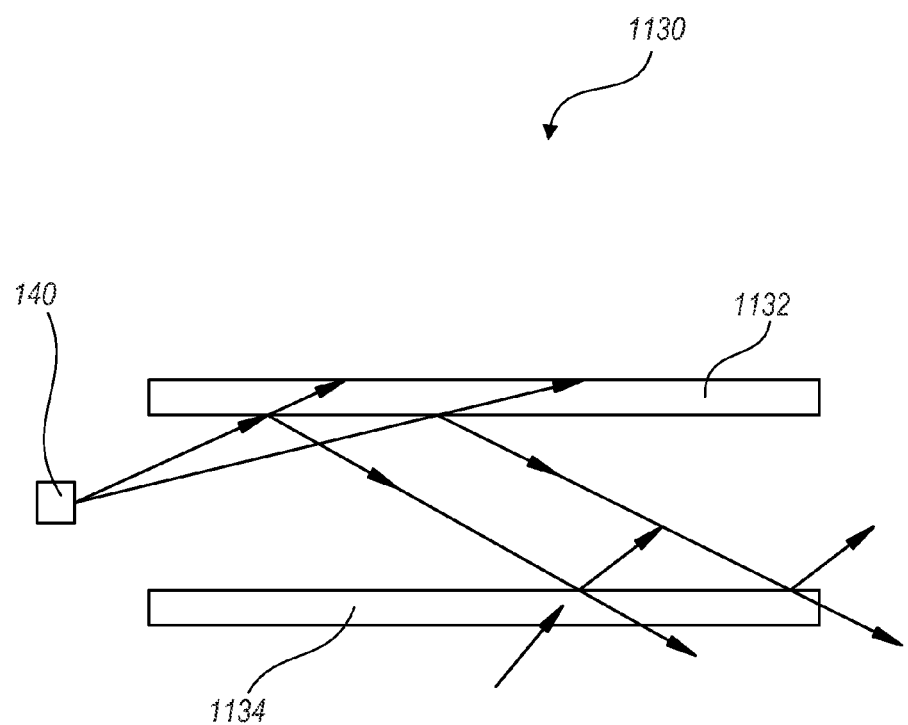
FIG. 11 is a schematic 2D ray-trace diagram illustrating operation of a combination of a hollow light guide having a passive transmissive upper panel and a passive transmissive lower panel, according to an embodiment.

FIG. 11 is a schematic 2D ray-trace diagram illustrating operation of a combination of a hollow light guide 1130 having a passive transmissive upper panel 1132 and a passive transmissive lower panel 1134; in FIG. 11, panels 1132 and 1134 are expanded from a single line to a volume in order to show internal reflections therein. Each surface 1142, 1144 of upper panel 1132 and 1146, 1148 of lower panel 1134 may be, for example, a clear smooth acrylic panel that generates Fresnel reflections each time light from an LED 140 impinges thereon, as shown. While some light may also be emitted from outer surfaces 1142, 1148, the Fresnel reflections at these as well as internal surfaces 1144, 1146 will cause at least some of the light to propagate down hollow light guide 1130.

Figure 12A:
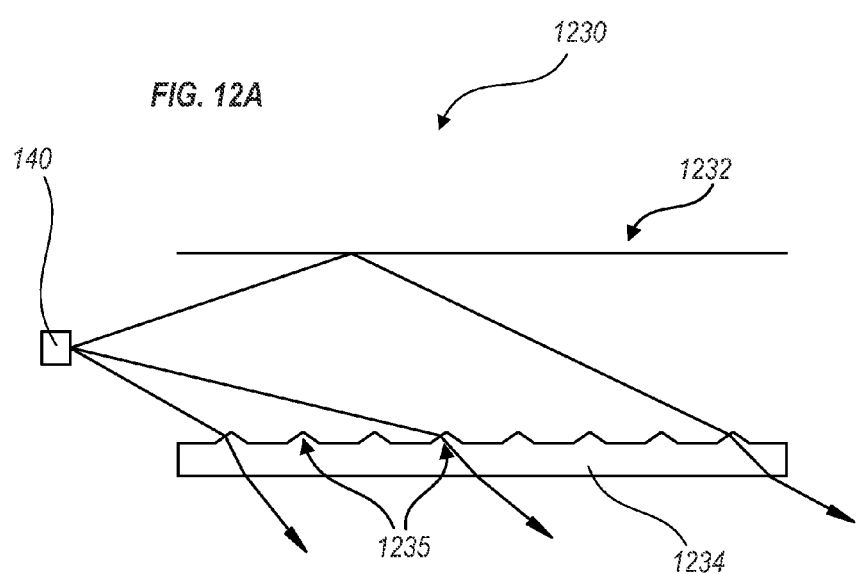
FIG. 12A is a cross-sectional view that schematically illustrates a hollow light guide having a passive top surface and an active bottom surface that features refractive protrusions, with an LED emitting light thereinto, according to an embodiment.
Figure 12B:
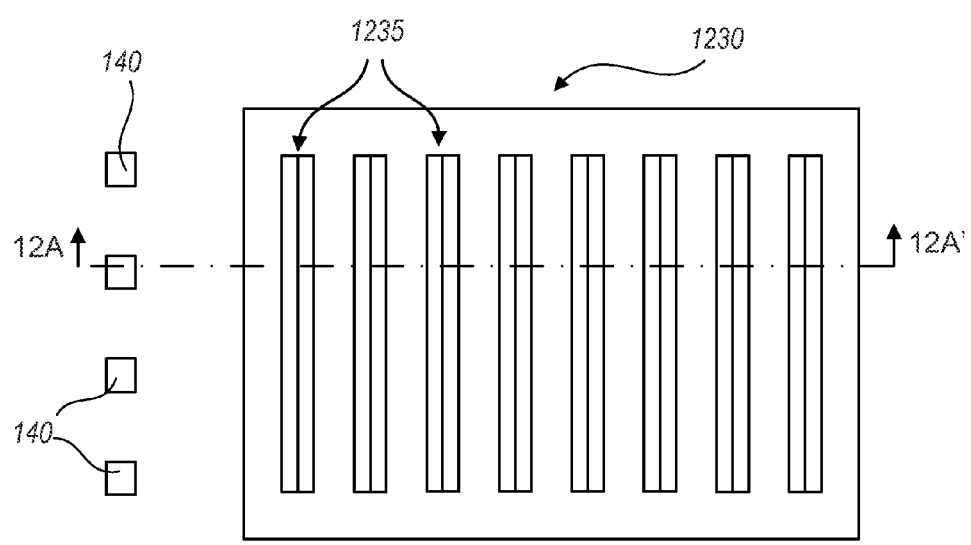
FIG. 12B is a plan view of the hollow light guide with LEDs of FIG. 12A.
Figure 13A:
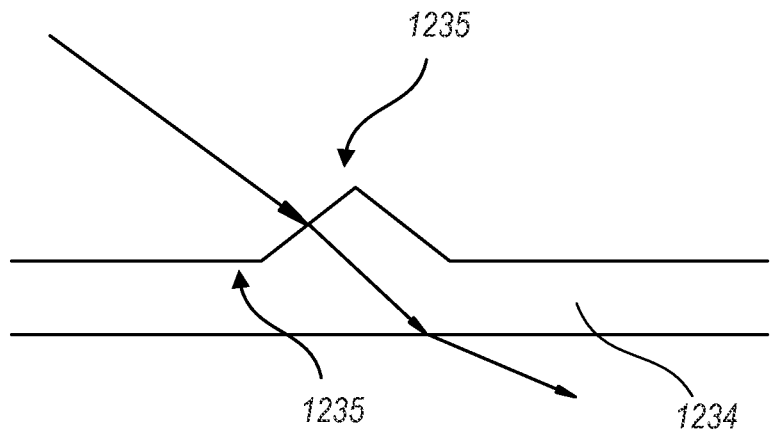
FIGS. 13A and 13B provide ray trace illustrations of light paths within an exemplary one of the refractive protrusions of FIG. 12A.
Figure 13B:
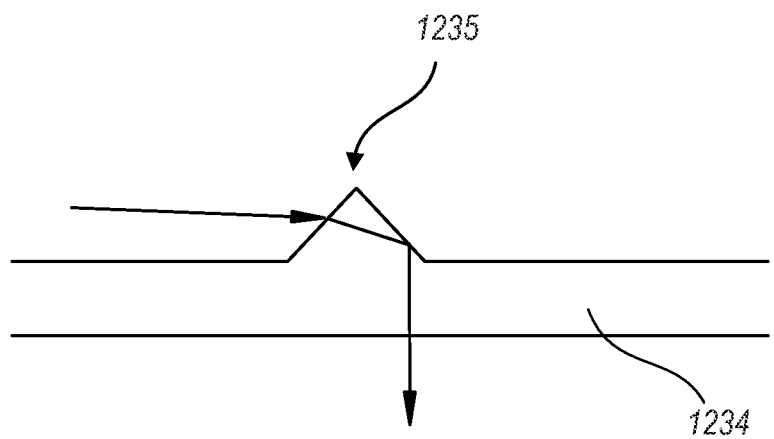

Active surfaces and/or materials of a hollow light guide can provide a variety of functions that depend on the type of feature present on each active surface and/or material. A first reason to create an active surface is to extract a percentage of light along the length of the light guide. This could be done by shaping a panel, sheet, or film, such as acrylic or any other optical material, to provide a refractive element. In such cases, the shaping can cause redirection of light, from piping down the hollow light guide, to exiting the hollow light guide in some defined direction. FIG. 12A is a cross-sectional view that schematically illustrates a hollow light guide 1230 having a passive top surface 1232 and an active bottom surface 1234 that features refractive protrusions 1235, with an LED 140 emitting light thereinto. FIG. 12B is a plan view of hollow light guide 1230 with LEDs 140. FIGS. 13A and 13B provide ray trace illustrations of light paths within an exemplary one of refractive protrusions 1235.

Figure 14:
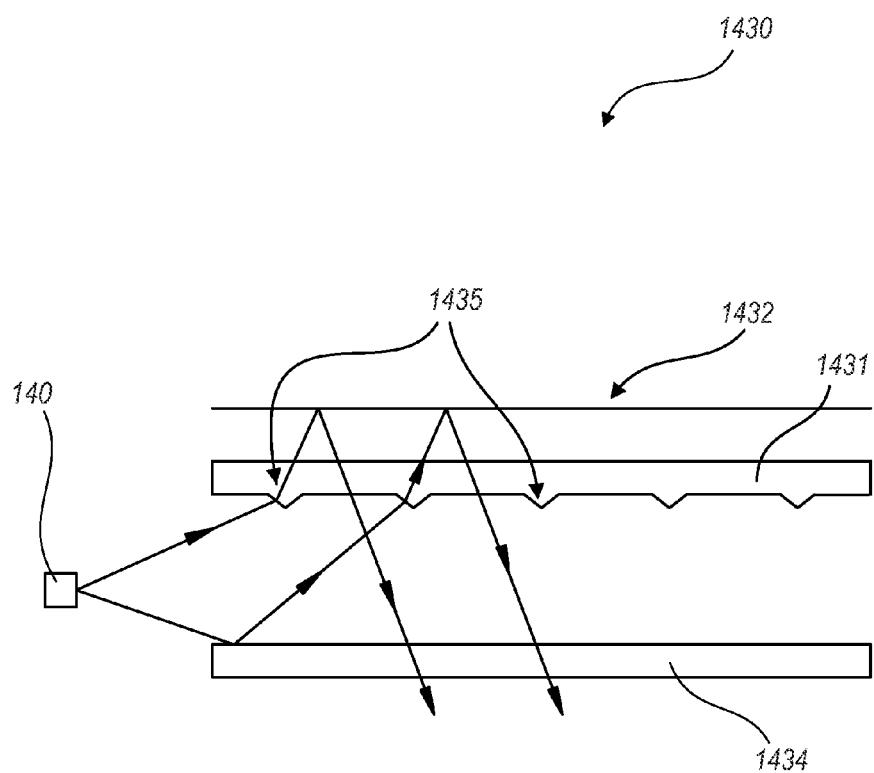
FIG. 14 is a schematic 2D ray-trace diagram illustrating operation of a hollow light guide 1430 that includes a reflective upper surface 1432 atop an active upper panel 1431, and a passive transmissive lower panel, according to an embodiment.

FIG. 14 is a schematic 2D ray-trace diagram illustrating operation of a hollow light guide 1430 that includes a reflective upper surface 1432 atop an active upper panel 1431, and a passive transmissive lower panel 1434. Active upper panel 1431 includes refractive protrusions 1435 that disrupt the light piping down light guide 1430 such that a portion of the light is redirected towards upper surface 1432, and is emitted through passive transmissive lower panel 1434. FIG. 14 thus schematically illustrates a composite active surface utilizing both refraction and reflection. Refractive extraction features could be shaped as linear features (e.g., as shown in FIG. 12A) or as radial shapes, cones, truncated cones, or any other shaping that would cause incident light to redirect from its path inside the light guide to exit the light guide in one or more specific directions. Size, density, and placement of refractive extraction features could vary in any manner along light guide surfaces (e.g., along one or both dimensions of such surfaces) to achieve a desired luminous appearance and/or optical distribution. Additionally, the optical features could be done in male or female variations.

Figure 15:
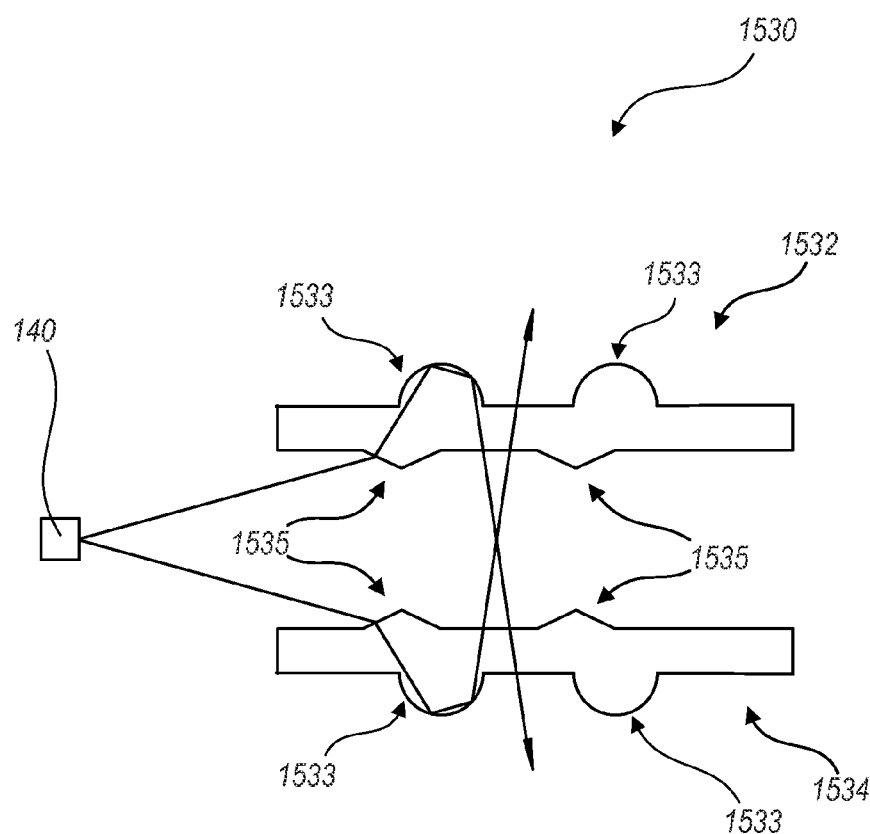
FIG. 15 is a schematic 2D ray-trace diagram illustrating operation of a combination of a hollow light guide that includes an active upper panel and an active lower panel, according to an embodiment.

FIG. 14 thus illustrates a variation of an active top surface that uses refraction to extract light opposite of the direction of exiting light, then uses a passive reflector behind that active surface to bounce the light back towards the direction of desired exiting light. FIG. 15 is a schematic 2D ray-trace diagram illustrating operation of a combination of a hollow light guide 1530 that includes an active upper panel 1532 and an active lower panel 1534. FIG. 15 thus shows a variation of a hollow light guide wherein both sides are active, refractive, reflective and transmissive in selected locations that complement each other for extraction to both sides of the hollow light guide. In hollow light guide 1530, refractive protrusions 1535 formed integrally with both active upper panel 1532 and active lower panel 1534 refract portions of light propagating down light guide 1530. The refracted portions reflect at rounded protrusions 1533, either by total internal reflection or by reflective materials applied thereto. The light reflected internally by rounded protrusions 1533 then passes entirely through both panels 1532, 1534 and exit light guide 1530. It should be understood that any of the techniques illustrated in FIGS. 12-15 may be applied to one or both sides of a hollow light guide, and light extracted thereby may be directed out of the surface that includes the light extraction feature, out of an opposing surface of the hollow light guide, or both.

In embodiments, another way of providing extraction features is to use a scattering or anisotropic reflective material. Such materials include metal sheets (e.g., steel or aluminum sheets) or transparent or translucent materials that are chemically etched, painted, or both. In such arrangements, an active reflective surface acts to redirect light from inside the hollow light guide through the opposite surface. The opposite surface could be either passive or active, but would need to be at least transmissive such that light could exit. Scattering could occur in one direction, or both, depending on the desired output direction.

Figure 16:
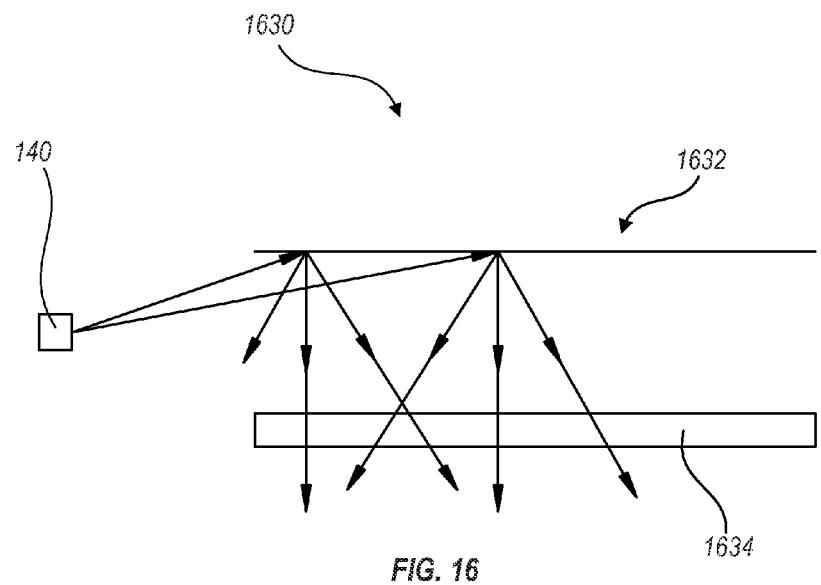
FIG. 16 is a schematic 2D ray-trace diagram illustrating operation of a combination of a hollow light guide that includes an active upper surface and a passive lower panel, according to an embodiment.
Figure 17:
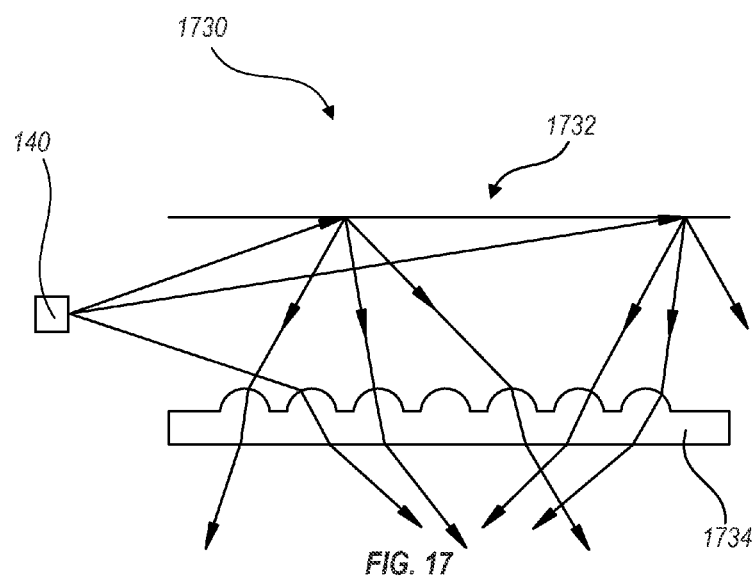
FIG. 17 is a schematic 2D ray-trace diagram illustrating operation of a combination of a hollow light guide that includes an active upper panel and an active lower panel, according to an embodiment.

FIG. 16 and FIG. 17 provide 2D illustrations of these effects. FIG. 16 is a schematic 2D ray-trace diagram illustrating operation of a combination of a hollow light guide 1630 that includes an active upper surface 1632 and a passive lower panel 1634. FIG. 17 is a schematic 2D ray-trace diagram illustrating operation of a combination of a hollow light guide 1730 that includes an active upper panel 1732 and an active lower panel 1734. Each of active upper panels 1632, 1732 reflects and scatters at least a portion of light incident thereon. Passive lower panel 1634 simply allows the light scattered thereby to pass through, while active lower panel 1734 further redirects the light through the action of refractive features 1735.

A second reason to introduce optical features into a hollow light guide surfaces is to either maintain the direction of light as at least substantially parallel within the light guide (that is, in line to the output of the original light emitters), or to redirect the light so that it travels partially or completely transverse to the initial direction of the light emitted by the light emitters. Features that can perform transverse redirection can be integrated with the extraction features discussed above, or implemented as separate features. For instance, the active scattering reflective material shown in FIGS. 16 and 17 could be oriented so that it redirects light rays substantially perpendicular to the path of initial travel inside of the hollow light guide.

Figure 18A:
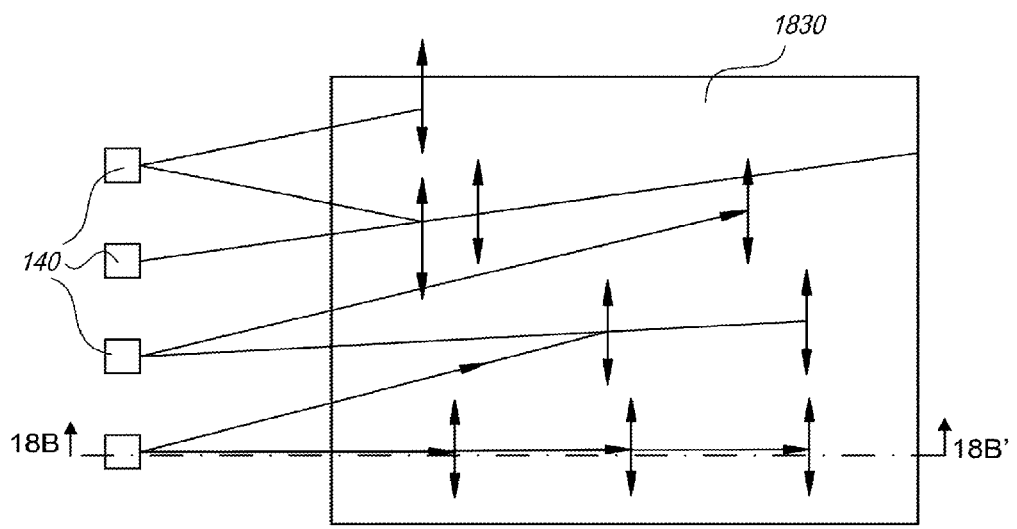
FIGS. 18A and 18B are schematic 2D ray-trace diagrams illustrating transverse redirection in a hollow light guide, according to an embodiment.
Figure 18B:
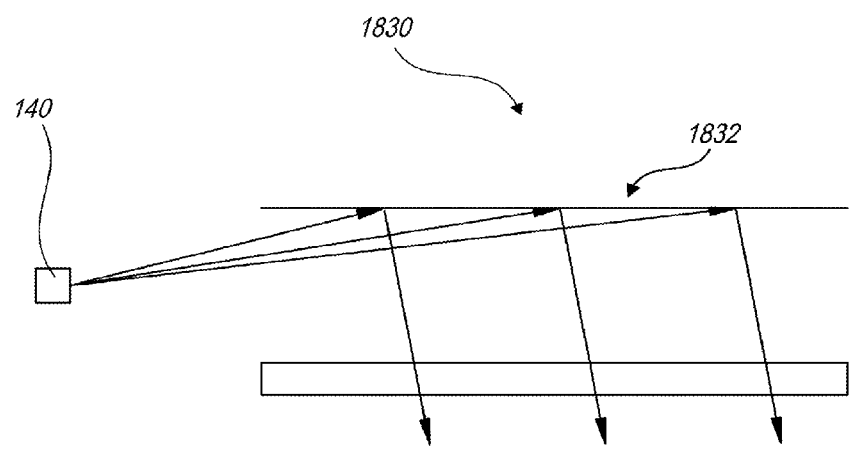

FIGS. 18A and 18B are schematic 2D ray-trace diagrams illustrating transverse redirection in a hollow light guide 1830; FIG. 18A is a plan view and FIG. 18B is a cross-section taken at line 18B-18B' in FIG. 18A. Scattering features in an upper surface 1832 provide lateral scattering, and a certain degree of scattering in the original direction of propagation.

Figure 19A:
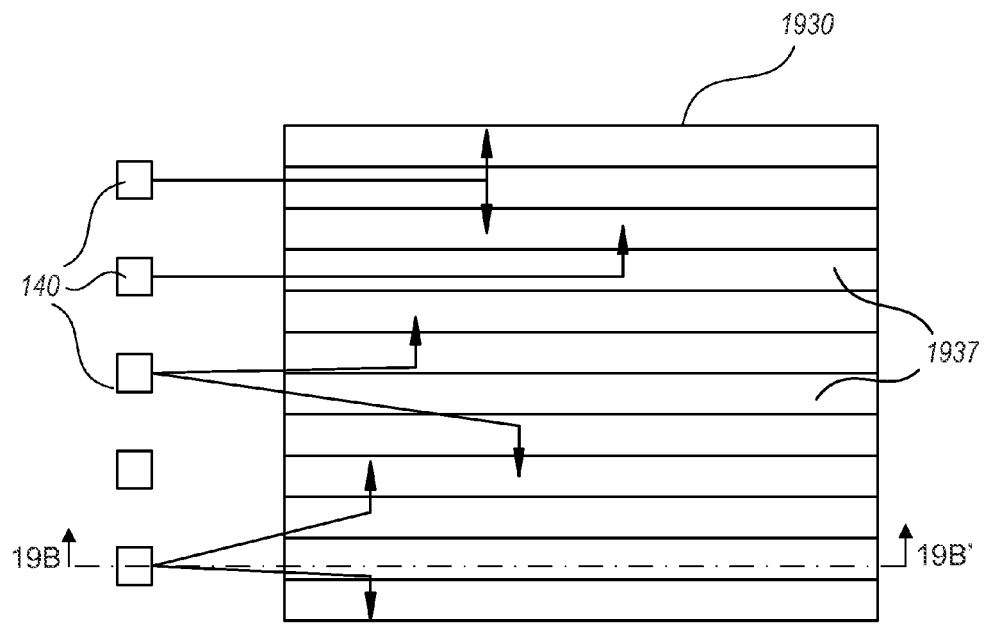
FIGS. 19A and 19B are schematic 2D ray-trace diagrams illustrating transverse redirection in a hollow light guide, according to an embodiment.
Figure 19B:
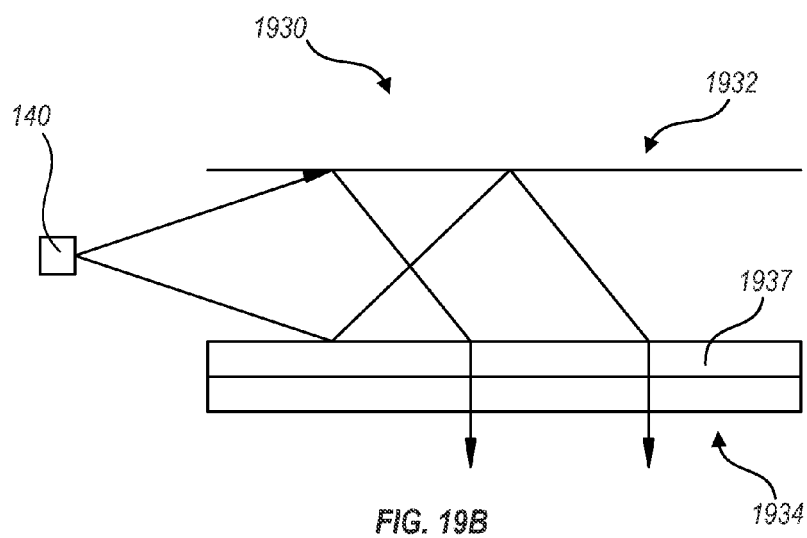

Similar behavior as that illustrated in FIG. 18 could also be achieved by using refractive shaping such as linear prisms. For example, FIGS. 19A, 19B are schematic 2D ray-trace diagrams illustrating transverse redirection in a hollow light guide 1930; FIG. 19A is a plan view and FIG. 19B is a cross-section taken at line 19B-19B' in FIG. 19A. Hollow light guide 1930 provides simple reflection from a top surface 1932 and scattering behavior in a lower, active surface 1934 that includes linear prisms 1937. Optical features such as linear prisms could be disposed on either side, or both sides, of an active surface. Transverse redirection could also be accomplished via the addition of an elliptical diffuser (that is, an element that selectively redirects light predominantly in one direction over another) to a passive surface.

Figure 20:
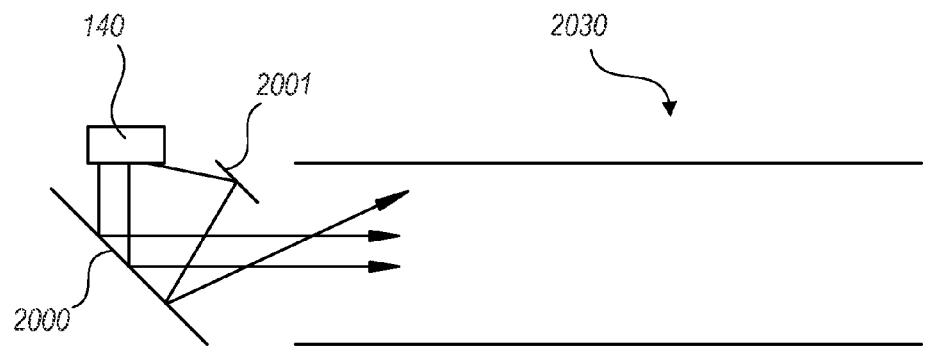
FIG. 20 is a schematic 2D ray-trace diagram illustrating use of reflectors to redirect light from an LED into a hollow light guide, according to an embodiment.
Figure 21:
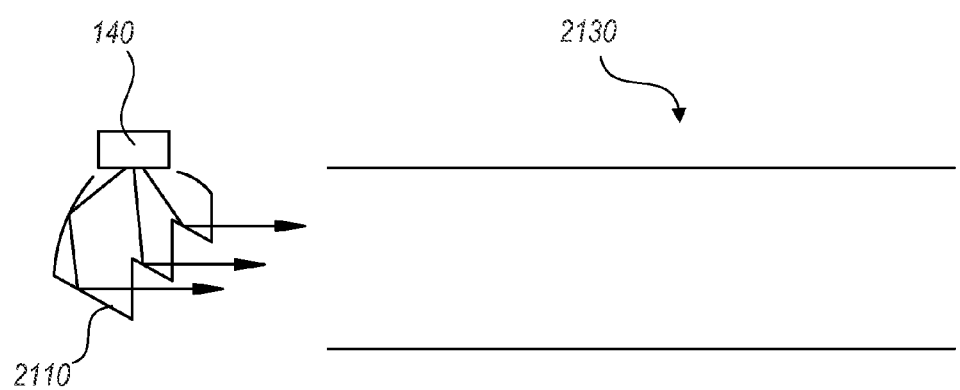
FIG. 21 is a schematic 2D ray-trace diagram illustrating use of a side emitting over-optic to redirect light from an LED into a hollow light guide, according to an embodiment.

In other embodiments, optical elements such as reflectors, side-emitting over-optics, or other optical elements may be utilized to direct light from source LEDs into a hollow light guide. These approaches facilitate orientation of LEDs in a direction in which their maximum output is not oriented parallel to the direction of the hollow light guide, which may be convenient in certain embodiments. FIG. 20 is a schematic 2D ray-trace diagram illustrating use of reflectors 2000, 2001 to redirect light from an LED 140 into a hollow light guide 2030. FIG. 21 is a schematic 2D ray-trace diagram illustrating use of a side emitting over-optic 2110 to redirect light from an LED 140 into a hollow light guide 2130.

Figure 22:
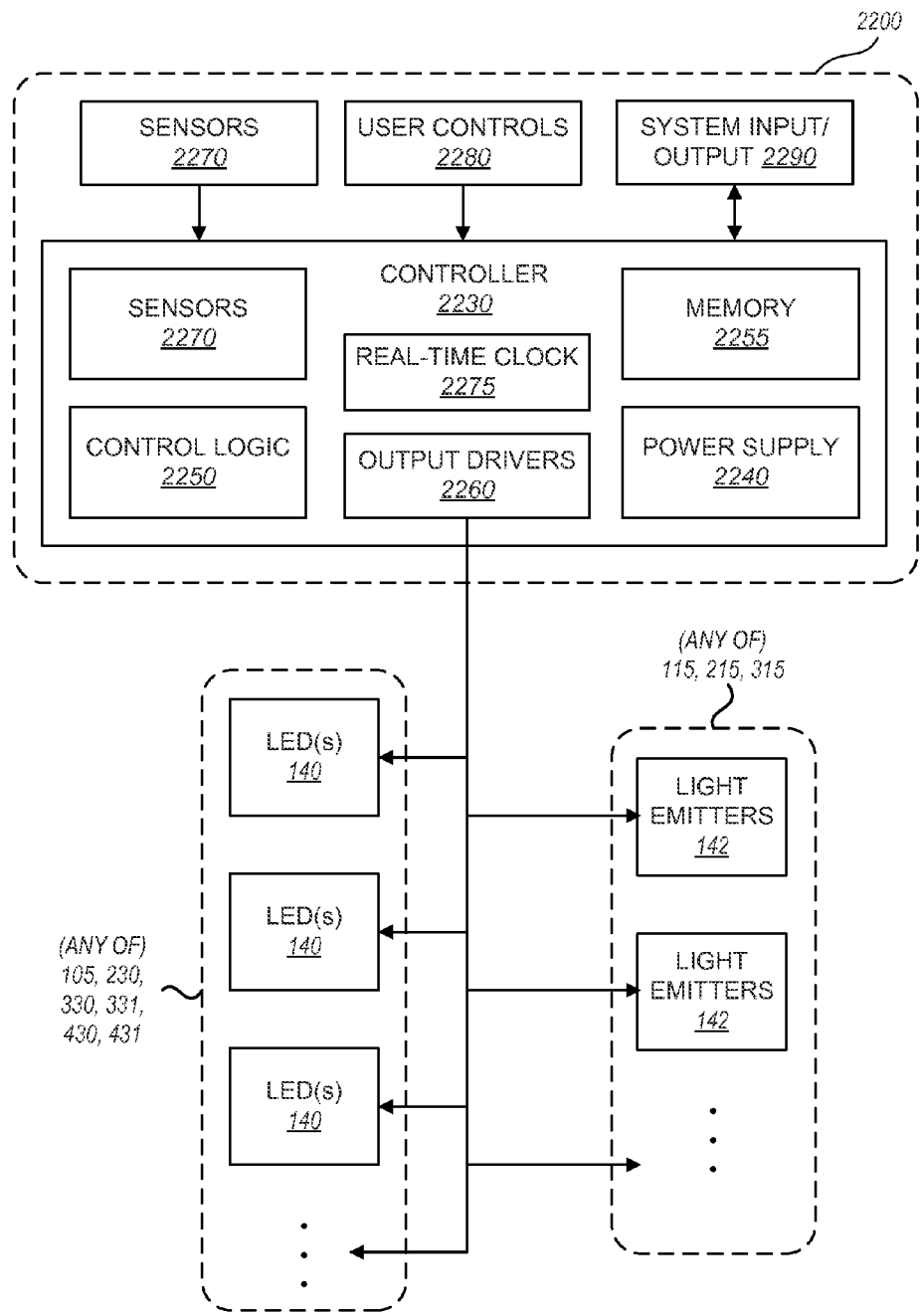
FIG. 22 is a schematic block diagram of a control system for an annulus shaped luminaire, according to an embodiment.

FIG. 22 is a schematic block diagram of a control system 2200 for an annulus shaped luminaire (e.g., control system 2200 may control any of annulus shaped luminaries 100, 200, 300 and/or 400, and other embodiments). Control system 2200 connects with external power (e.g., standard 120V or 240V power) and provides appropriate power therefrom for LEDs 140 and/or light emitters 142 of an associated annulus shaped luminaire, as required for a given application. LEDs 140 act as light sources for luminous panels such as annulus light source 105 and panels 230, 330, 331, 430, 431, 530, 630, 730, 830, 930, 1030, 1130, 1230, 1430, 1530, 1630, 1730, 1830, 1930, 2030, 2330, 2331, 2430, 2431, 2530 and 2532 described elsewhere herein. Light emitters 142 may be any sort of light emitters (e.g., incandescent, fluorescent, LED and/or other types) that act as light sources for accent lights 115, 215, 315 described elsewhere herein. Most components of control system 2200 are optional and need not be included when functionality of such components is not required. Also, the components included in the description of control system 2200 need not be physically located in the associated annulus shaped luminaire. For example, some of the components shown may be located in the luminaire, while others are located remotely and communicate with the luminaire through wired, wireless and/or optical connections.

A very basic embodiment of control system 2200 simply drives LEDs 140 and/or light emitters 142 using a power supply 2240. In this embodiment, all other components shown in control system 2200 need not exist; that is, power supply 2240 can condition external power for LEDs 140 and/or light emitters 142, with no capability for control. A slightly more advanced embodiment of control system 2200 includes user controls 2280 such as, for example, an on/off switch, typically located remotely from the luminaire being controlled.

A further embodiment of control system 2200 utilizes input from sensors 2270 to control operation of LEDs 140 and/or light emitters 142. As shown in FIG. 22, sensors 2270 may be remote from a controller 2230 of control system 2200 or may be integrated therein. Controller 2230 utilizes control logic 2250 to interpret information from sensors 2270 (and/or user controls 2280) to determine which LEDs 140 and/or light emitters 142 should receive power, and how much power. Sensors 2270 may be for example daylight sensors, other environmental sensors, or sensors that detect presence or absence of objects in a given area (e.g., optical sensors that could be utilized to determine whether parking spaces are open or filled).

Control logic 2250 may be provided in the form of discrete logic devices, programmable logic devices, gate arrays, microcontrollers, microprocessors, and the like. Controller 2230 may also include memory 2255 for storage of software, operational preferences, operational history or any other information associated with input to (or control or operation of) an associated luminaire. Controller 2230 may also include a real-time clock 2275 to provide time information for use by control logic 2250. Controller 2230 may also include output drivers 2260 as features that are separate from power supply 2240; for example, power supply 2240 may convert external AC power to filtered DC power, while output drivers 2260 selectively gate application of the filtered DC power to appropriate ones of LEDs 140 and/or light emitters 142 under the direction of control logic 2250.

System input/output 2290 represents any form of information provided to or from controller 2230 that is not included in information provided by sensors 2270 and/or user controls 2280. Input to system input/output 2290 could include, for example, information provided by a host computer that receives warnings such as tornado, tsunami, flood and/or avalanche warnings. Output from system input/output 2290 could be information uploaded to a host computer or to another control system 2200, such as information gathered from sensors 2270, history of control status as determined by control logic 2250, operational status of control system 2200 and the like. System input/output 2290 may be provided by wired, wireless and/or optical means. In embodiments, a master control system 2200 may exist at a first location (for example, a central control box, a host computer or a luminaire) and provide output information that is received and applied directly at one or more second locations by luminaries that do not have their own sensors, dedicated user controls, memory, etc. but utilized simplified control logic, power supply and/or output drivers to implement control based on the received information.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configure the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Figure 23A:
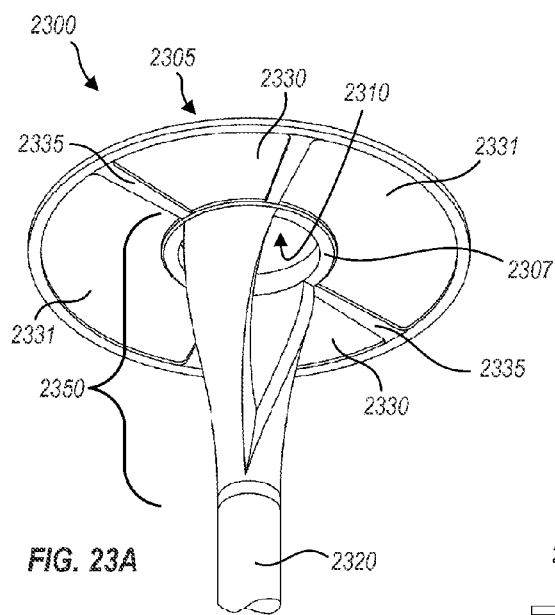
FIGS. 23A, 23B and 23C show perspective, elevation and top plan views of an annulus shaped luminaire, according to an embodiment.
Figure 23B:
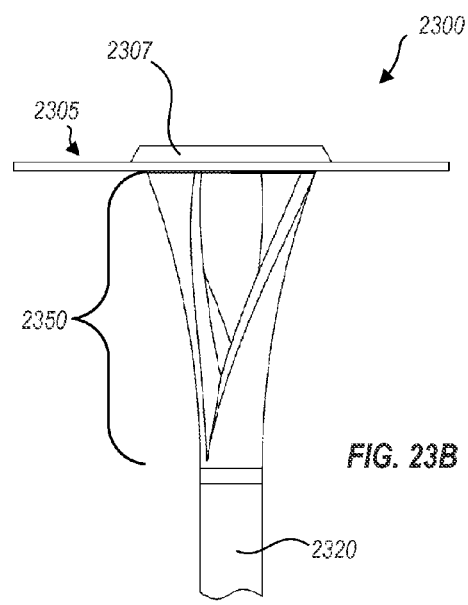
Figure 23C:
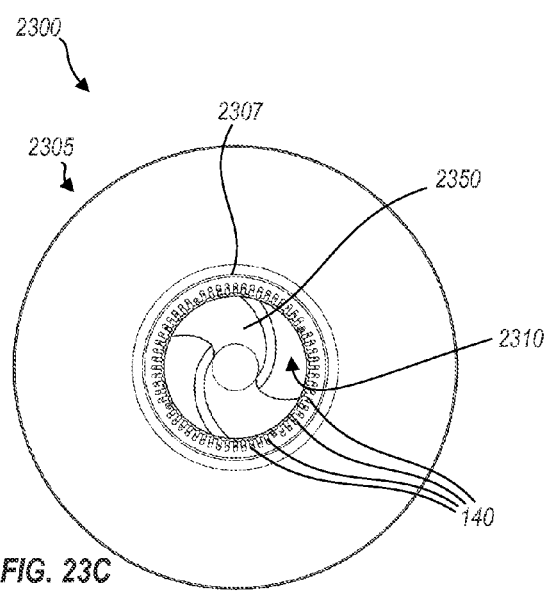

FIGS. 23A, 23B and 23C show perspective, elevation and top plan views of an annulus shaped luminaire 2300. Luminaire 2300 includes an annular structure 2305 that forms an opening 2310 at a center thereof. Luminaire 2300 also includes a "twist" shaped transition structure 2350 that couples a support structure 2320 (e.g., a pole) with annular structure 2305. Annular structure 2305 includes luminous panels 2330, 2331 separated by radial mullions 2335. LEDs 140 are disposed within an inner ring 2307 that bounds opening 2310, and emit light that is directed into luminous panels 2330, 2331 (only representative ones of LEDs 140, mullions 2335 and luminous panels 2330, 2331 are labeled in FIGS. 23A, 23B and 23C, for clarity of illustration).

Figure 24A:
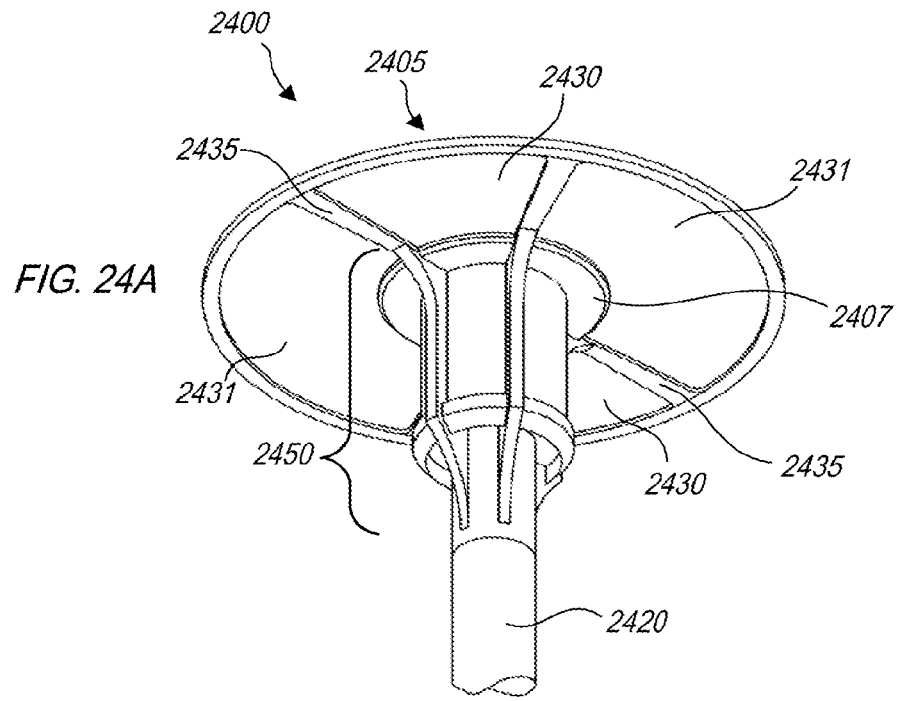
FIGS. 24A and 24B show perspective and elevation views of an annulus shaped luminaire, according to an embodiment.
Figure 24B:
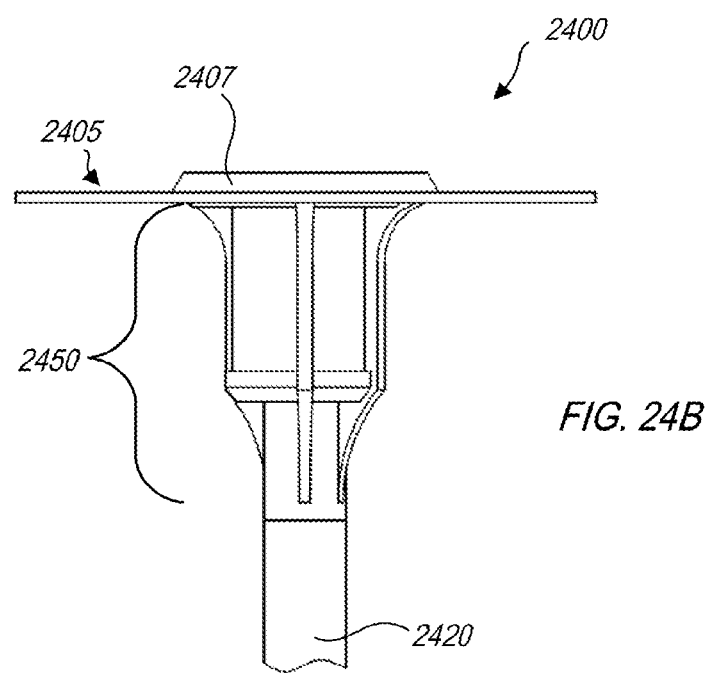

FIGS. 24A and 24B show perspective and elevation views of an annulus shaped luminaire 2400. Luminaire 2400 includes an annular structure 2405 and a "lantern" shaped transition structure 2450 that couples a support structure 2420 (e.g., a pole) with annular structure 2405. Annular structure 2405 includes luminous panels 2430, 2431 separated by radial mullions 2435. LEDs (not visible in the views of FIGS.

24A, 24B) are disposed within an inner ring 2407, and emit light that is directed into luminous panels 2430, 2431 (only representative ones of mullions 2435 and luminous panels 2430, 2431 are labeled in FIGS. 24A and 24B, for clarity of illustration).

Figure 25:
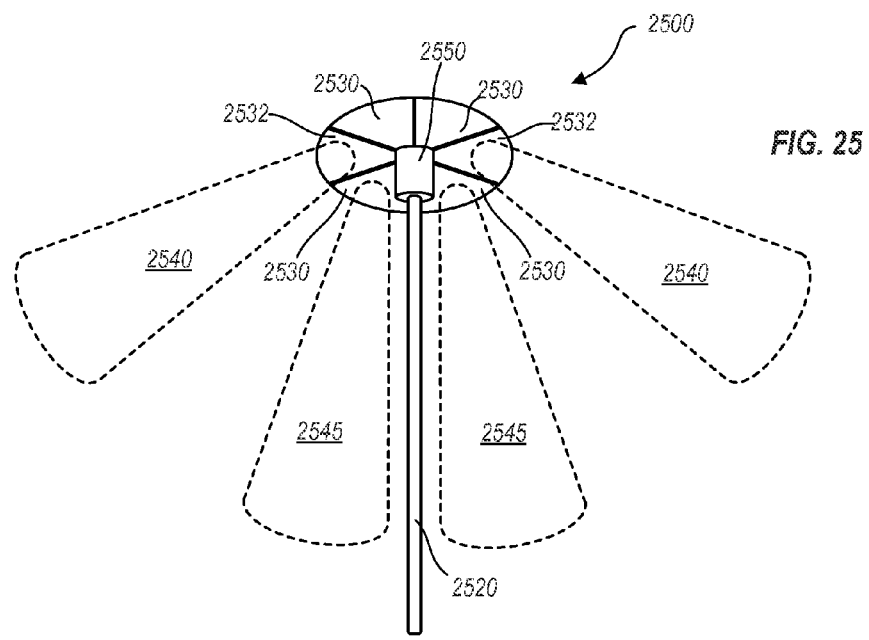
FIG. 25 is a schematic drawing of an annulus shaped luminaire illustrating how luminous panels can be arranged with differing optics from one another to achieve a desired photometric distribution, according to an embodiment.

FIG. 25 is a schematic drawing of an annulus shaped luminaire 2500 illustrating how luminous panels can be arranged with differing optics from one another to achieve a desired photometric distribution. Luminaire 2500 is coupled with a pole 2520 through a transition structure 2550, and includes four luminous panels 2530 and two luminous panels 2532 that each emit light, generated for example by LEDs (not shown in FIG. 25). Luminous panels 2532 utilize optics that cast output light 2540 outward from transition structure 2550 and pole 2520. For example, optics illustrated in connection with hollow light guides in FIGS. 9 through 19 herein may be arranged to cast output light 2540 in such directions. However, luminous panels 2530 are utilize different optics that do not cast output light 2545 as far outward from transition structure 2550 and pole 2520. Thus, a photometric distribution of luminaire 2500 may illuminate an area further out from luminous panels 2532 than from panels 2530. Such an illumination pattern may be desirable for the purpose of illuminating pathways, roadways and the like while avoiding the costs (in terms of electrical power and stray light) of illuminating areas to the side of such pathways, roadways and the like. Casting light away from pole 2520 and transition structure 2550 is also advantageous when transition structure 2550 includes an accent light (e.g., any of accent lights 115, 215, 315) that is dimmer than luminous panels 2530 and 2532, and/or conveys information via color or dynamics, as discussed above. That is, avoiding "washing out" the accent light with light from luminous panels 2530, 2532 may be advantageous in terms of aesthetics as well as conveying information. In certain embodiments, a net photometric distribution of an annulus shaped luminaire may be symmetrical, as suggested by the configuration shown in FIG. 25, in which opposing luminous panels 2532 cast output light outwardly and opposite from one another. In other embodiments, a net photo metric distribution of an annulus shaped luminaire may be asymmetrical, for example in cases where optics of the luminaire directs light from all luminous panels thereof in a particular direction, that is, not radially outward in the direction of each luminous panel.

Figure 26:
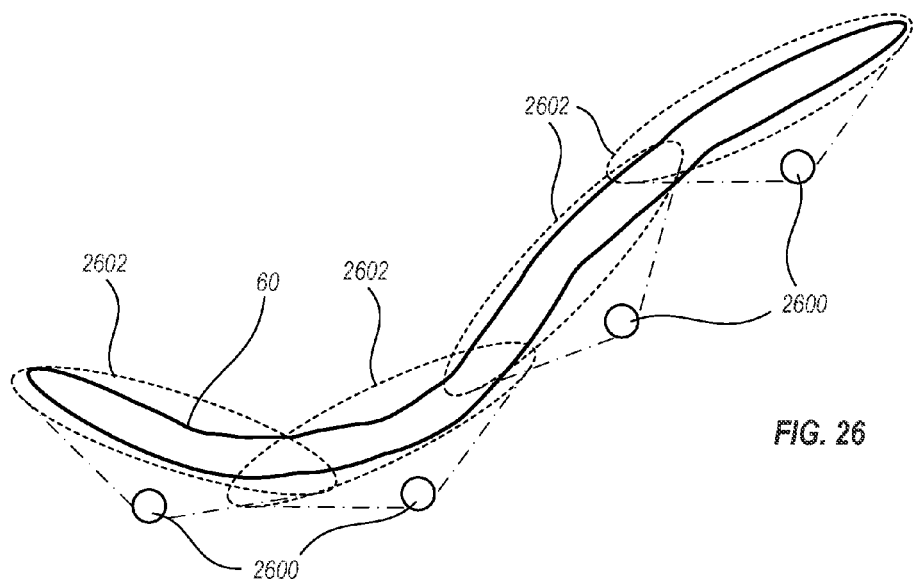
FIG. 26 schematically illustrates a pathway 60 illuminated by several annulus shaped luminaries having asymmetrical photometric distributions in which each luminaire casts light to one side, according to an embodiment.

FIG. 26 schematically illustrates a pathway 60 illuminated by several annulus shaped luminaires 2600 having asymmetrical photometric distributions in which each luminaire 2600 casts light to one side of the luminaire. As shown, a distribution 2602 of light cast by each luminaire 2600 is roughly elliptical and to the side of the corresponding luminaire 2600. Such distributions may be described as asymmetric with respect to the support structure on which the luminaire is mounted. Light that forms each distribution 2602 may originate from one or more luminous panels of each luminaire 2600. Distributions 2602 combine to illuminate pathway 60 with minimal light overspill, advantageously minimizing power required to illuminate pathway 60 and stray light in the area surrounding pathway 60, as opposed to illumination that would be supplied by a similar number of Lambertian emitters. That is, pathway 60 could be illuminated by a larger number of Lambertian emitters at higher installation cost, or the same number (four) of Lambertian emitters emitting a great deal of light each, requiring higher power to operate and generating more stray light.

Figure 27:
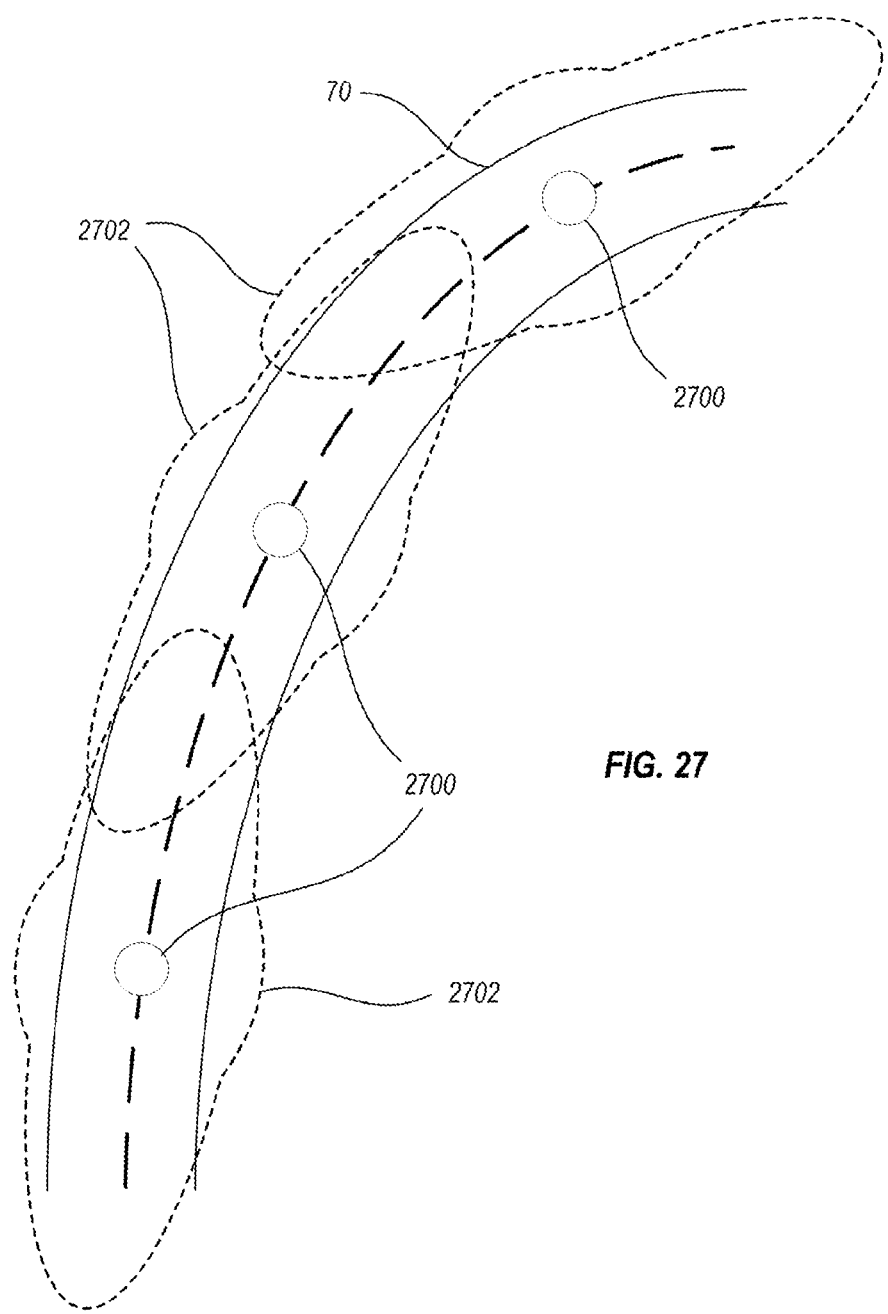
FIG. 27 schematically illustrates a roadway illuminated by several annulus shaped luminaries having symmetrical photometric distributions, according to an embodiment.

FIG. 27 schematically illustrates a roadway 70 illuminated by several annulus shaped luminaries 2700 having symmetrical photometric distributions. The photometric distributions of luminaries 2700 may be produced, for example, by luminaries 2500, FIG. 25. As shown, a distribution 2702 of light cast by each luminaire 2700 extends strongly in two opposing directions from the corresponding luminaire 2700, with a small area also illuminated in a circle about the luminaire. Light that forms each distribution 2702 may originate from one or more luminous panels of each luminaire 2700. Distributions 2702 combine to illuminate roadway 70 with minimal light overspill, advantageously minimizing power required to illuminate roadway 70 and stray light in the area surrounding roadway 70, as opposed to illumination that would be supplied by a similar number of Lambertian emitters.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. An annulus shaped luminaire, comprising:
    an annular structure that includes a plurality of luminous panels separated by radial mullions, the luminous panels comprising a light guide; and
    transition structure that couples a support structure of the luminaire with the annular structure;
    wherein the one or more luminous panels emit light that illuminates an area adjacent to the luminaire; and
    wherein one or more of the radial mullions includes one or more LEDs that generate the light emitted by the one or more luminous panels.

2. The annulus shaped luminaire of claim 1, the one or more luminous panels being a single luminous panel circumscribing a 360 degree arc of the annular structure.

3. The An annulus shaped luminaire, comprising:
    an annular structure that includes four luminous panels separated by radial mullions, wherein:
        a first and a second one of the luminous panels each circumscribe an approximate 60 degree arc of the annular structure and are disposed diametrically opposed to one another across the annular structure; and
        a third and a fourth one of the luminous panels each circumscribe an approximate 120 degree arc of the annular structure, are disposed diametrically opposed to one another across the annular structure, and are interspersed with the first and the second ones of the luminous panels about the annular structure; and transition structure that couples a support structure of the luminaire with the annular structure;

wherein the one or more luminous panels emit light that illuminates an area adjacent to the luminaire.

4. The annulus shaped luminaire of claim 3, wherein each of the first and second ones of the luminous panels comprises a first directional optic type, such that light emitted from the first and second ones of the luminous panels is symmetric about a first axis that passes through the first and second ones of the luminous panels.

5. The annulus shaped luminaire of claim 4, wherein each of the third and fourth ones of the luminous panels comprises a second directional optic type that is different from the first directional optic type, such that light emitted from the third and fourth ones of the luminous panels is symmetric about a second axis that passes through the third and fourth ones of the luminous panels, the second axis being perpendicular to the first axis.

6. The annulus shaped luminaire of claim 3, wherein the first and second ones of the luminous panels form a first pair, the third and fourth ones of the luminous panels form a second pair, and the first and second pairs of luminous panels emit light from light sources that are different from one another, such that light emitted from the annulus shaped luminaire is of differing luminous intensities from the respective first and second pairs of luminous panels.

7. An annulus shaped luminaire, comprising:
an annular structure that includes one or more luminous panels, wherein the one or more luminous panels emit light that illuminates an area adjacent to the luminaire;
transition structure that couples a support structure of the luminaire with the annular structure; and
one or more non-luminous panels that form portions of the annular structure and are separated from the one or more luminous panels by radial mullions.

8. The annulus shaped luminaire of claim 3, the transition structure comprising an accent light.

9. The annulus shaped luminaire of claim 8, wherein a majority of light produced by the annulus shaped luminaire is emitted by the luminous panels and a minority of the light produced by the annulus shaped luminaire is emitted by the accent light.

10. The annulus shaped luminaire of claim 8, each of the one or more luminous panels including directional optics that direct light from the luminous panels away from the accent light.

11. The annulus shaped luminaire of claim 8, wherein a characteristic of light emitted by the accent light is different from the characteristic of light emitted by accent sources of adjacent annulus shaped luminaries, so as to convey information.

12. The annulus shaped luminaire of claim 8, wherein light emitted by the accent light is dynamically controlled to convey information.

13. The annulus shaped luminaire of claim 11, wherein the information conveyed is one or more of a tornado warning, a tsunami warning, a flood warning, an avalanche warning, and an indication that parking is available.

14. The annulus shaped luminaire of claim 3, the annular structure forming an opening at a center of the annular structure that is bounded by an inner ring, wherein the inner ring:
bounds the one or more luminous panels at the opening; and
includes one or more LEDs that generate the light emitted by the one or more luminous panels.

15. An annulus shaped luminaire, comprising:
an annular structure that includes one or more luminous panels, at least one of the one or more luminous panels comprising a hollow light guide; and
transition structure that couples a support structure of the luminaire with the annular structure;
wherein the one or more luminous panels emit light that illuminates an area adjacent to the luminaire.

16. An annulus shaped luminaire, comprising:
an annular structure that includes one or more luminous panels; and
transition structure that couples a support structure of the luminaire with the annular structure;
wherein the one or more luminous panels emit light that illuminates an area adjacent to the luminaire;
at least one of the one or more luminous panels comprising directional optics such that the area that is illuminated adjacent to the luminaire is asymmetric with respect to the support structure.

17. The annulus shaped luminaire of claim 15, the transition structure comprising an accent light.

18. The annulus shaped luminaire of claim 17, wherein a majority of light produced by the annulus shaped luminaire is emitted by the luminous panels and a minority of the light produced by the annulus shaped luminaire is emitted by the accent light.

19. The annulus shaped luminaire of claim 17, each of the one or more luminous panels including directional optics that direct light from the luminous panels away from the accent light.

20. The annulus shaped luminaire of claim 17, wherein a characteristic of light emitted by the accent light is different from the characteristic of light emitted by accent sources of adjacent annulus shaped luminaries, so as to convey information.

21. The annulus shaped luminaire of claim 17, wherein light emitted by the accent light is dynamically controlled to convey information.

22. The annulus shaped luminaire of claim 21, wherein the information conveyed is one or more of a tornado warning, a tsunami warning, a flood warning, an avalanche warning, and an indication that parking is available.

23. The annulus shaped luminaire of claim 15, the annular structure forming an opening at a center of the annular structure that is bounded by an inner ring, wherein the inner ring:
bounds the one or more luminous panels at the opening; and
includes one or more LEDs that generate the light emitted by the one or more luminous panels.

* * * * *